(12) United States Patent
Roth et al.

(10) Patent No.: US 9,491,111 B1
(45) Date of Patent: Nov. 8, 2016

(54) SECURING SERVICE CONTROL ON THIRD PARTY HARDWARE

(71) Applicant: Amazon Technologies, Inc., Reno, NV (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 14/476,468

(22) Filed: Sep. 3, 2014

(51) Int. Cl.
  *H04L 29/06* (2006.01)
  *H04L 12/911* (2013.01)
  *H04L 12/24* (2006.01)

(52) U.S. Cl.
  CPC ............... *H04L 47/70* (2013.01); *H04L 41/50* (2013.01); *H04L 63/0428* (2013.01)

(58) Field of Classification Search
  CPC ..................... H04L 63/0428; H04L 41/50
  See application file for complete search history.

(56) References Cited

U.S. PATENT DOCUMENTS

| | | |
|---|---|---|
| 4,218,582 A | 8/1980 | Hellman et al. |
| 4,405,829 A | 9/1983 | Rivest et al. |
| 5,643,085 A | 7/1997 | Aityan et al. |
| 5,643,086 A | 7/1997 | Alcorn et al. |
| 5,666,533 A | 9/1997 | Horiguchi et al. |
| 5,848,159 A | 12/1998 | Collins et al. |
| 5,867,578 A | 2/1999 | Brickell et al. |
| 5,905,799 A | 5/1999 | Ganesan |
| 6,071,190 A | 6/2000 | Weiss et al. |
| 6,237,097 B1 | 5/2001 | Frankel et al. |
| 6,364,796 B1 | 4/2002 | Nakamura et al. |
| 6,631,354 B1 | 10/2003 | Leymann et al. |
| 6,722,986 B1 | 4/2004 | Lyons et al. |
| 7,063,615 B2 | 6/2006 | Alcorn et al. |
| 7,917,747 B2 | 3/2011 | Wolf |
| 8,291,468 B1 | 10/2012 | Chickering |
| 8,407,584 B1 | 3/2013 | Boodman et al. |
| 8,473,754 B2 | 6/2013 | Jones et al. |

(Continued)

FOREIGN PATENT DOCUMENTS

WO    WO2008118648    10/2008

OTHER PUBLICATIONS

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

(Continued)

*Primary Examiner* — Hadi Armouche
*Assistant Examiner* — Ali Shayanfar
(74) *Attorney, Agent, or Firm* — Davis Wright Tremaine LLP

(57) ABSTRACT

Techniques for securely instantiating control plane components of provider services, at least a portion of which are instantiated within secure execution environments, are described herein. A request to instantiate the control plane of a service provided by a computing resource service provider is fulfilled by selecting a target computer system. The target computer system is selected based at least in part on the hardware capabilities of the target computer system. The control plane is then instantiated within a secure execution environment operating on the target computer system.

20 Claims, 9 Drawing Sheets

(56) References Cited

U.S. PATENT DOCUMENTS

| | | |
|---|---|---|
| 9,116,733 B2 | 8/2015 | Banga et al. |
| 9,154,479 B1 | 10/2015 | Sethi |
| 9,246,690 B1 | 1/2016 | Roth et al. |
| 2002/0184046 A1 | 12/2002 | Kamada et al. |
| 2004/0176068 A1 | 9/2004 | Paatero |
| 2005/0091535 A1 | 4/2005 | Kavalam et al. |
| 2005/0278418 A1 | 12/2005 | Rathakrishnan et al. |
| 2006/0161887 A1 | 7/2006 | Krishnaswamy et al. |
| 2007/0050763 A1 | 3/2007 | Kagan et al. |
| 2007/0153715 A1 | 7/2007 | Covington et al. |
| 2007/0206799 A1 | 9/2007 | Wingert et al. |
| 2008/0216071 A1 | 9/2008 | Gidalov |
| 2009/0112359 A1* | 4/2009 | Sanguinetti ............ G06Q 10/08 700/228 |
| 2009/0313406 A1 | 12/2009 | Suh et al. |
| 2010/0031325 A1 | 2/2010 | Maigne et al. |
| 2010/0077473 A1 | 3/2010 | Ohta et al. |
| 2012/0084838 A1* | 4/2012 | Inforzato ............... G06F 21/575 726/4 |
| 2012/0144457 A1 | 6/2012 | Counterman |
| 2012/0159184 A1 | 6/2012 | Johnson et al. |
| 2012/0192177 A1 | 7/2012 | Tsirkin |
| 2013/0007239 A1 | 1/2013 | Agarwal et al. |
| 2013/0117561 A1 | 5/2013 | Chawla et al. |
| 2013/0151846 A1 | 6/2013 | Baumann et al. |
| 2013/0174150 A1 | 7/2013 | Nakajima |
| 2013/0174151 A1 | 7/2013 | Nakajima |
| 2013/0179682 A1 | 7/2013 | Ramachandran et al. |
| 2013/0198853 A1 | 8/2013 | McKeen et al. |
| 2013/0227286 A1* | 8/2013 | Brisson ................. H04L 63/062 713/168 |
| 2013/0246778 A1* | 9/2013 | Nikara ................. H04L 41/0816 713/1 |
| 2013/0282776 A1 | 10/2013 | Durrant et al. |
| 2013/0312117 A1* | 11/2013 | Sapp, II ................. G06F 21/62 726/30 |
| 2013/0318343 A1 | 11/2013 | Bjarnason et al. |
| 2013/0326504 A1* | 12/2013 | Tsirkin ................. G06F 9/45558 718/1 |
| 2014/0075496 A1 | 3/2014 | Prakash et al. |
| 2014/0105393 A1 | 4/2014 | Kolesnikov |
| 2014/0181359 A1 | 6/2014 | Zhang et al. |
| 2014/0201841 A1 | 7/2014 | Deshpande et al. |
| 2014/0223543 A1 | 8/2014 | Jeansonne et al. |
| 2014/0282935 A1 | 9/2014 | Lal et al. |
| 2014/0283098 A1 | 9/2014 | Phegade et al. |
| 2014/0317686 A1 | 10/2014 | Vetillard |
| 2014/0325515 A1 | 10/2014 | Salmela et al. |
| 2014/0331317 A1 | 11/2014 | Singh |
| 2014/0351583 A1 | 11/2014 | Bettale et al. |
| 2014/0373012 A1 | 12/2014 | Ylitalo et al. |
| 2015/0007175 A1 | 1/2015 | Potlapally et al. |
| 2015/0058629 A1 | 2/2015 | Yarvis et al. |
| 2015/0127834 A1 | 5/2015 | Udupi et al. |
| 2015/0143347 A1 | 5/2015 | Jones et al. |
| 2015/0143374 A1 | 5/2015 | Banga et al. |
| 2015/0143375 A1 | 5/2015 | Bruso et al. |
| 2015/0199509 A1* | 7/2015 | Wille ................. G06Q 20/3227 726/16 |
| 2015/0200948 A1* | 7/2015 | Cairns .................... G06F 21/44 726/4 |
| 2015/0244716 A1* | 8/2015 | Potlapally ............. H04L 63/064 713/155 |
| 2015/0254451 A1 | 9/2015 | Doane et al. |
| 2015/0278528 A1 | 10/2015 | Xing et al. |
| 2016/0088009 A1 | 3/2016 | Gupta et al. |

OTHER PUBLICATIONS

Hoekstra, M., "Intel® SGX for Dummies (Intel® SGX Design Objectives)," <https://software.intel.com/en-us/blogs/2013/09/26/protecting-application-secrets-with-intel-s . . . > [retrieved Sep. 3, 2014], 4 pages.

Hoekstra, M., "Intel® SGX for Dummies—Part 2," <https://software.intel.com/en-us/blogs/2014/06/02/intel-sgw-for-dummies-part-2> [retrieved Sep. 3, 2014], 3 pages.

Hoekstra, M., "Intel® SGX for Dummies—Part 3," <https://software.intel.com/en-us/blogs/2014/09/01/intel-sgw-for-dummies-part-3> [retrieved Sep. 3, 2014], 3 pages.

"Intel® Software Guard Extension Programming Reference," Intel®, Reference No. 329298-001US, Sep. 2013, 156 pages.

McKeen, F., et al., "Innovative Instructions and Software Model for Isolated Execution," Proceedings of the 2nd International Workshop on Hardware and Architectural Support for Security and Privacy, Jun. 23-24, 2013, Tel-Aviv, Israel, pp. 1-8.

* cited by examiner

SECURING SERVICE CONTROL ON THIRD PARTY HARDWARE

BACKGROUND

Modern computer systems place a high importance on maintaining data and application security. In a distributed and/or virtual computer system environment, where a plurality of users, services, applications, virtual machines, controlling domains and hosts may have access to a computer system, maintaining data and application security may be a difficult problem. In a distributed and/or virtual computer system environment, for example, where the computer hardware may be provided by a computing resource service provider and/or may also be provided by a third party such as, for example, a customer of the computing resource service provider, both the customers and the computing resource service provider may also wish for additional isolation of, or security for, sensitive or restricted information, protecting computer resource service provider information from the customer and protecting customer information from the computing resource service provider.

Encrypting data or applications may help ameliorate security concerns, but users often desire additional assurances. For example, computing resource service providers may desire additional assurances of the security of a computer system by isolating applications so that the computer system is insulated from application failures. Additionally, a computing resource service provider may desire additional assurances that applications and data are protected from access by a controlling domain or an operating system that has trusted status and can read or write directly from computer system memory. Accordingly, both users and computing resource service providers may desire assurances of the isolation and security of data and applications operating within a computing resource service provider environment.

BRIEF DESCRIPTION OF THE DRAWINGS

Various embodiments in accordance with the present disclosure will be described with reference to the drawings, in which.

DETAILED DESCRIPTION

Figure 1:
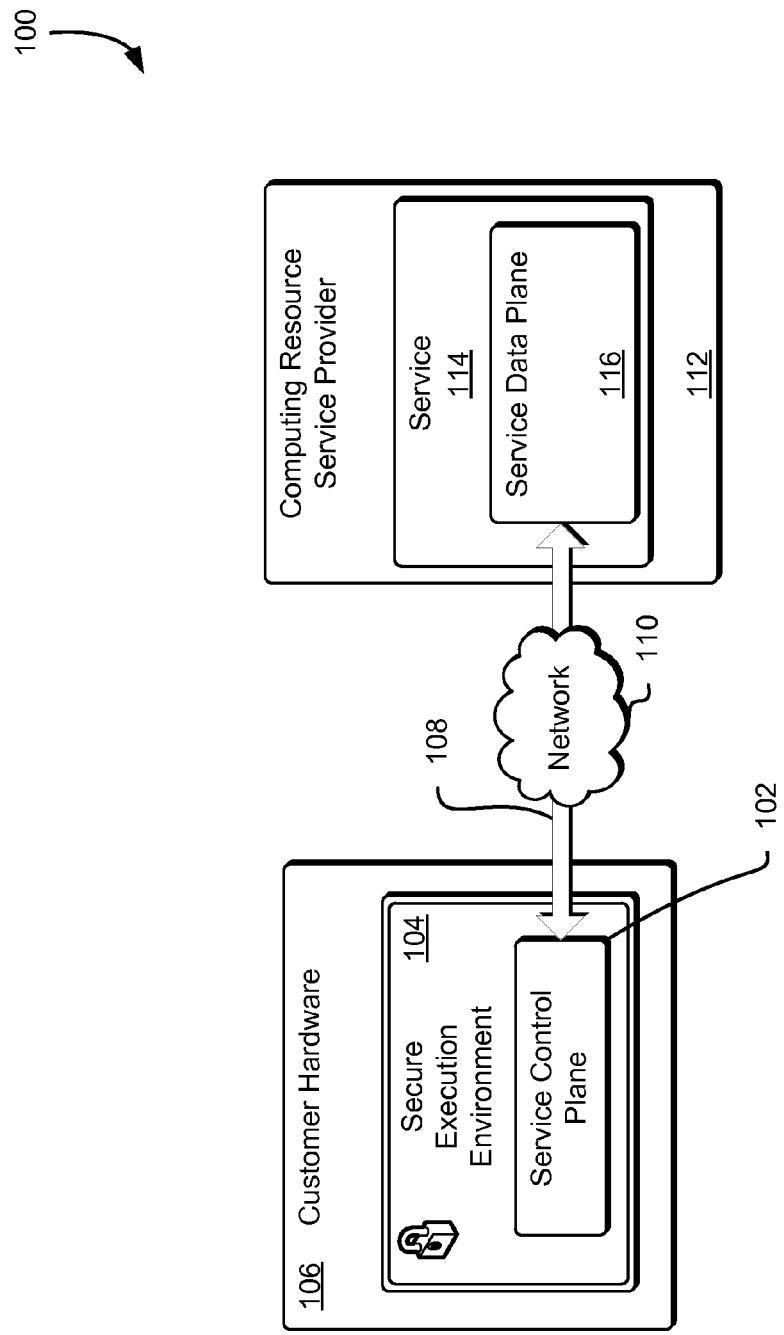
FIG. 1 illustrates an example environment where the control plane of a service may be secured within a secure execution environment in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, processes, and methods for providing and configuring access to components of control planes of secured services operating within secure execution environments (an example of which is an "enclave"). The secure execution and environments and the components of the control planes may be operating in conjunction with computer systems provided by a computing resource service provider. As an illustrative example, a service to place and instantiate virtual machine instances may include proprietary software to place and provision such virtual machines embodied within the control plane of the service. By instantiating the placement and provisioning elements within a secure execution environment, the computing resource service provider is assured that the computer system is insulated from application failures associated with those elements and that the proprietary software is secured from access by privileged entities operating on that hardware. Generally, a computing resource service provider provides one or more services (e.g., to customers of the computing resource service provider) and may provide software and/or data associated with those services. The computing resource service provider may isolate elements of services within secure execution environments to protect those elements from being compromised and also to protect associated computer systems from execution faults that may occur in those elements. The computing resource provider may also provide elements of the services within secure execution environments to allow trusted execution of the service elements on, for example, hardware provided by a third party or hardware provided by a customer of the computer resource service provider.

The control plane of a service may be an application or collection of applications that provide functionality such as, for example, functionality for the configuration, operation, or control of the service. The control plane may administratively control the service and/or may administratively control resources associated with the service by providing access (e.g., using an API) to the control and configuration functionality of the service and/or to the control and configuration functionality for the resources associated with the service. For example, the control plane may provide access to functionality associated with virtual machine placement for a virtual machine service. The control plane may include a plurality of control plane components (e.g., programming modules), each of which can be configured to provide a subset of the service control plane functionality. The data plane of such services may include functionality such as, for example, service interfaces, data processing elements or communication elements. Additionally, if a customer or third party has computer system resources that may be made available to the computing resource service provider, operating those service elements within a secure execution environment, using those computer system resources allows customers of the computing resource service provider to be assured that the applications and data are secure and the computing resource service provider is assured that the data and applications are isolated and that a customer (or third party) does not have access to the applications and/or data.

For example, a computing resource service provider may be configured to run applications and processes configured to access sensitive data or provide sensitive services. The sensitive data may include, for example, usernames, passwords, security keys, routing tables, or other sensitive data. The sensitive services may include, for example, packet routing, encryption, certification, or other sensitive services. The applications or processes may be implemented as services and may include control planes and data planes which may provide a separation between user and system functionality.

A computing resource service provider may configure part of the control plane of a service for operation on a customer-provided computer system and may also configure part of the data plane of a service for operation on a customer-provided computer system. When doing so, the computing resource service provider may enhance the security of the control plane (or the data plane) of a service when the control plane or data plane are running on a customer-provided computer system. Because a customer-provided computer system may include operating systems, privileged users or controlling domains that may have full access to the computer system resources, a computing resource service provider may wish to obtain additional security assurances before hosting service control planes or data planes on a customer-provider computer system. A control plane or a data plane of a service may be secured from access by any entity associated with the customer-provided computer system without the proper credentials by securing the control plane or the data plane of the service within a secure execution environment. The secure execution environment may secure the control plane or the data plane from access by any entity associated with the customer-provided computer system, even those entities that are typically trusted entities such as operating systems, privileged users, privileged applications and/or other such normally privileged entities.

FIG. 1 illustrates an example environment 100 where the control plane of a service provided by a computing resource service provider may be secured within a secure execution environment on hardware provided by a customer of a computing resource service provider in accordance with an embodiment. A service 114 may be provided by a computing resource service provider 112. The service 114 may be configured to provide access to computing system resources, or to provide routing for network services, or may be configured to provide encryption services or may be configured to provide other such services. The service may also be configured to provide a virtual machine instance and/or to provide functionality to instantiate, provision, place and/or destroy one or more virtual machine instances. For example, a virtual computer system service such as the virtual computer system service described herein above may be provided to allow users to provision, place and operate VM instances that are instantiated on physical computer devices. The virtual computer system service may include control plane operational elements which may include sensitive data and/or algorithms related to, for example, the provisioning and placement of VM instances. In another example, the control plane of a service may be configured to deliver encrypted network traffic (where, for example, the encryption is provided by a control plane of a service) that is sent out from the service, or to measure all traffic that is received by and/or sent by a service. Such a control plane may be instantiated within a secure execution environment and may use the secure execution environment functionality to perform the encryption and/or the measurement and the security of the encryption and/or the measurements may be ensured by the secure execution environment.

In the example environment illustrated in FIG. 1, a control plane 102 of the service 114 (e.g., a virtual computer system service) may be instantiated within customer hardware 106 and may, in some embodiments, connect 108 back to the data plane 116 of the service 114 operating within the computing resource service provider 112 via a network 110. In some embodiments, the data plane 116 of the service 114 may be operating with an environment provided by the computing resource service provider 112, or may be operating within a secure execution environment hosted by the customer hardware 106, or may be operating within some other such secured environment which may be operating within a computing resource service provider environment, a customer environment or a third party environment or may be operating in a combination of these and/or other such environments. The control plane 102 of the service 114 may be configured to provide response information based at least in part on the one or more requests (e.g., web services requests) that may be received by the control plane 102. Code executing on the customer hardware 106, but outside of a secure execution environment, may not be able to inspect and/or cause alterations to the response information, even when that response information leaves the secure execution environment because the response information was generated within the secure execution environment and may only exit the secure execution environment in encrypted form and because the code may lack a key sufficient to decrypt the response information.

As used herein, the terms "customer" and "third party" may be used with respect to computer systems and/or computer system resources to refer to computer systems and/or computer system resources owned, operated, controlled, and/or otherwise provided by entities other than a computing resource service provider. While "customers" are used throughout for the purpose of illustration, the techniques described herein are adaptable to any entity other that the computing resource service provide including, but not limited to, secondary customers (i.e., customers of a customer), other business units associated with the computing resource service provider and/or other third parties in general. Unless stated explicitly or made clear by context, such terms may be used interchangeably herein to refer to such computer system resources not provided by a computing resource service provider. The techniques described herein with respect to customer environments, hardware, computer systems and/or computer system resources may also be applicable to third party environments, hardware, computer systems, and/or computer system resources.

Restricted access to control planes of services running within secure execution environments may be securely provided to users of computer systems within a distributed and/or virtualized computer environment including, for example, environments which may be provided by customers of computing resource service providers. The control planes of services which may be provided by the computing resource service provider may typically operate within computing resource service provider domains and may provide access to one or more secure services by authorized users. All or part of the control planes of services may also be configured to operate within domains provided by customers of a computing resource service provider such as a customer datacenter and/or other such customer-provided computing environments. All or part of the control planes of services may also be configured to operate within domains provided by third parties in third party provided computing environments. Secure execution environments within such domains may be configured to provide secure access to one or more services for one or more users, processes, applications, modules and/or other such entities associated with a computer system.

A secure execution environment may be instantiated within a computer system provided by a customer of a computing resource service provider and/or by a third party provider. Applications and/or data may also be instantiated within that secure execution environment. Such secure execution environments and/or applications or data within secure execution environments may be configured and/or instantiated on a selected computer system (also referred to herein as a "target computer system") by sending a request (referred to herein as a "provisioning request") specifying how the secure execution environment and/or the applications may be configured and/or how and where they may be instantiated. The target computer system (or the selected computer system) is the computer system that is selected to host the secure execution environment based at least in part on hardware capabilities of the target computer system, the location of the target computer system, the proximity of the target computer system to other computer system resources or a combination of these and/or other such selection criteria.

A secure execution environment and/or an application may be instantiated by sending the provisioning request to a computer system, which may be configured to receive such a provisioning request and instantiate a secure execution environment and/or an application on the target computer system in response to such a request. The provisioning request may be sent to a service and forwarded to the target computer system, which may then instantiate the secure execution environment and/or the application. A provisioning request may be sent as a communication over a network and as a result of such communication, the secure execution environment and/or the application may be instantiated by a service and/or by a computer system in accordance with that request. As may be contemplated, the methods of delivery and/or the contents of a provisioning request as described herein are illustrative examples and other such methods of delivery and/or contents of a provisioning request may be considered as within the scope of the present disclosure.

A provisioning request may include a specification for capabilities such as hardware capabilities that may indicate a suitable environment upon which a secure execution environment may be instantiated. In some embodiments, a suitable environment may be located based on host availability, level of security desired (also referred to herein as "security requirements"), one or more system policies, availability of supporting hardware and/or software or based upon a combination of these and/or other such factors. For example, a provisioning request may specify a minimum level of security (also referred to herein as a "level of assurance") required in order to instantiate the secure execution environment. As described herein, a level of assurance is a measure of how secure an environment may be provided by a particular computer system, based on the hardware, software, and/or firmware that may be made available to that computer system. A provisioning request may also include data and/or metadata associated with the configuration and/or instantiation of a secure execution environment and may be issued as a service request. A service request, which is a request to a service for access to one or more capabilities and/or resources provided by the service, may be sent to the service as an application programming interface request (an "API request"), or as a library call, or as a combination of these and/or other such requests. An example of a service request is a web service request, which is a request that may be sent to a service using a network address associated with the service. The service may have a web interface, which may use a network protocol such as hypertext transfer protocol and may provide access to the service using that web interface.

A provisioning request may include specifications for secure execution environments, applications and/or data to be configured to provide access to data planes of services within a secure execution environment on a computer system provided by a customer of a computing resource service provider and/or by a third party provider while ensuring that the applications and/or data remain inaccessible to privileged entities operating within the computer system provided by a customer of a computing resource service provider and/or by a third party provider. Such data planes of services may be instantiated within any domain which is configured to securely execute such services on that domain. In some embodiments, a data plane of a service may be instantiated by accessing a provider service operating within the computing resource service provider environment, or by accessing a service operating within the customer-provided environment, or by accessing a service operating within a third party provided environment or by accessing a service operating within a combination of these and/or other such provided environments. The service may be configured to receive instantiation requests for such services and may also be configured to locate suitable domains where such a data plane may be securely instantiated. A suitable domain may be located based on host availability, level of security desired, one or more system policies, availability of supporting hardware and/or software or based upon a combination of these and/or other such factors. In some embodiments, data planes may be instantiated for services provided by the computing resource service provider. Such provider services may include one of one or more services configured to provide access to resources of a computer system. Such services may be configured to provide data processing, data storage, service interfaces, permission services, security policies, security operations, encryption, decryption, and/or other such services. Data planes of such services may be securely installed within a secure execution environment operating on a customer-provided computer system such that the code associated with the data plane of the service may be inaccessible to users or applications on the customer-provided computer system as well as to other services, processes, applications, modules, controlling domains and/or other such entities.

A computing resource service provider service may be configured to provide access to control planes of secured services by hosting the control planes of such secured services within a secure execution environment on a computer system provided by a customer of a computing resource service provider and/or by a third party provider. Hosting control planes of such secured services within a secure execution environment may ensure that the applications and/or data remain inaccessible to privileged entities operating within the computer system provided by a customer of a computing resource service provider and/or by a third party provider. Such control planes of secured services may be instantiated within any domain which is configured to securely execute such services on that domain. In some embodiments, a control plane of a secured service may be instantiated by accessing a provider service operating within the computing resource service provider environment, or by accessing a service operating within the customer-provided environment, or by accessing a service operating within a third party provided environment or by accessing a service operating within a combination of these and/or other such provided environments.

The service may be configured to receive instantiation requests (using, for example, a provisioning request as described herein) and may also be configured to locate suitable domains where such a control plane may be securely instantiated. A suitable domain may be located based on host availability, level of security desired, one or more system policies, availability of supporting hardware and/or software or based upon a combination of these and/or other such factors. Control planes may be instantiated for services provided by the computing resource service provider. Such provider services may include one of one or more services configured to provide access to resources of a computer system. Such services may be configured to provide data processing, data storage, service interfaces, permission services, security policies, encryption, and/or other such services. Control planes of such services may be securely installed within a secure execution environment operating on a customer-provided computer system such that the code associated with the control plane of the service may be inaccessible to users or applications on the customer-provided computer system as well as to other services, processes, applications, modules, controlling domains and/or other such entities.

The control plane 102 of the service 114 may be securely instantiated within the customer hardware 106 regardless of the applications, services, processes, modules and/or other such operating system elements which may be operating on the customer hardware 106 by instantiating the control plane 102 of the service 114 within a secure execution environment 104 on the customer hardware 106. The secure execution environment 104 may contain and/or otherwise administer access to functionality associated with one or more secure execution environments and may also contain and/or otherwise administer applications and data stored within the secure execution environment 104 such as the control plane 102. As described herein above, the secure execution environment 104 may be configured such that trusted users and/or services may have access to functionality associated with the secure execution environment 104 in order to use the secure execution environment functionality. The secure execution environment functionality may include, but may not be limited to, starting and stopping the secure execution environment, instantiating applications within the secure execution environment, sending encrypted data to the secure execution environment, receiving encrypted data from the secure execution environment or other such secure execution environment functionality. The secure execution environment 104 may also be configured such that trusted users and/or services may have access to the applications operating within and/or data stored within the secure execution environment (e.g., the control plane 102). Such access to the applications operating within and/or data stored within a secure execution environment may include authorization to send data to and/or receive data from the secure execution environment using one or more encryption methodologies as described herein. A user, client, service, process, application, module, or other such entity with access to a service and/or access to the resources served by that service may use that secure execution environment functionality to further secure data and/or applications associated with that service. In the example illustrated in FIG. 1, the control plane 102 may be secured within the customer hardware 106 such that the contents of the control plane 102 are not accessible by applications and/or users associated with the customer hardware 106.

In an illustrative example, the virtual computer system service described herein above may be implemented with proprietary software to provision virtual computer systems. Such proprietary software may be part of the control plane of the service and may typically operate within a secure environment provided by a computing resource service provider. The computing resource service provider may determine that, for example, a better customer experience may result from allowing the control plane for the virtual computer system service to operate within an environment provided by a customer such as, for example, the customer hardware 106. Instantiating the control plane 102 within a secure execution environment 104 on the customer hardware 106 may secure the proprietary provisioning software so that it is not accessible by the customer and/or by any malicious actors which may obtain access to the customer hardware 106. As may be contemplated, the types of services which may be instantiated within a secure execution environment and the functionality of the control plane associated with such services described herein are illustrative examples and other such services and control plane functionality may be considered as within the scope of the present disclosure.

Figure 2:
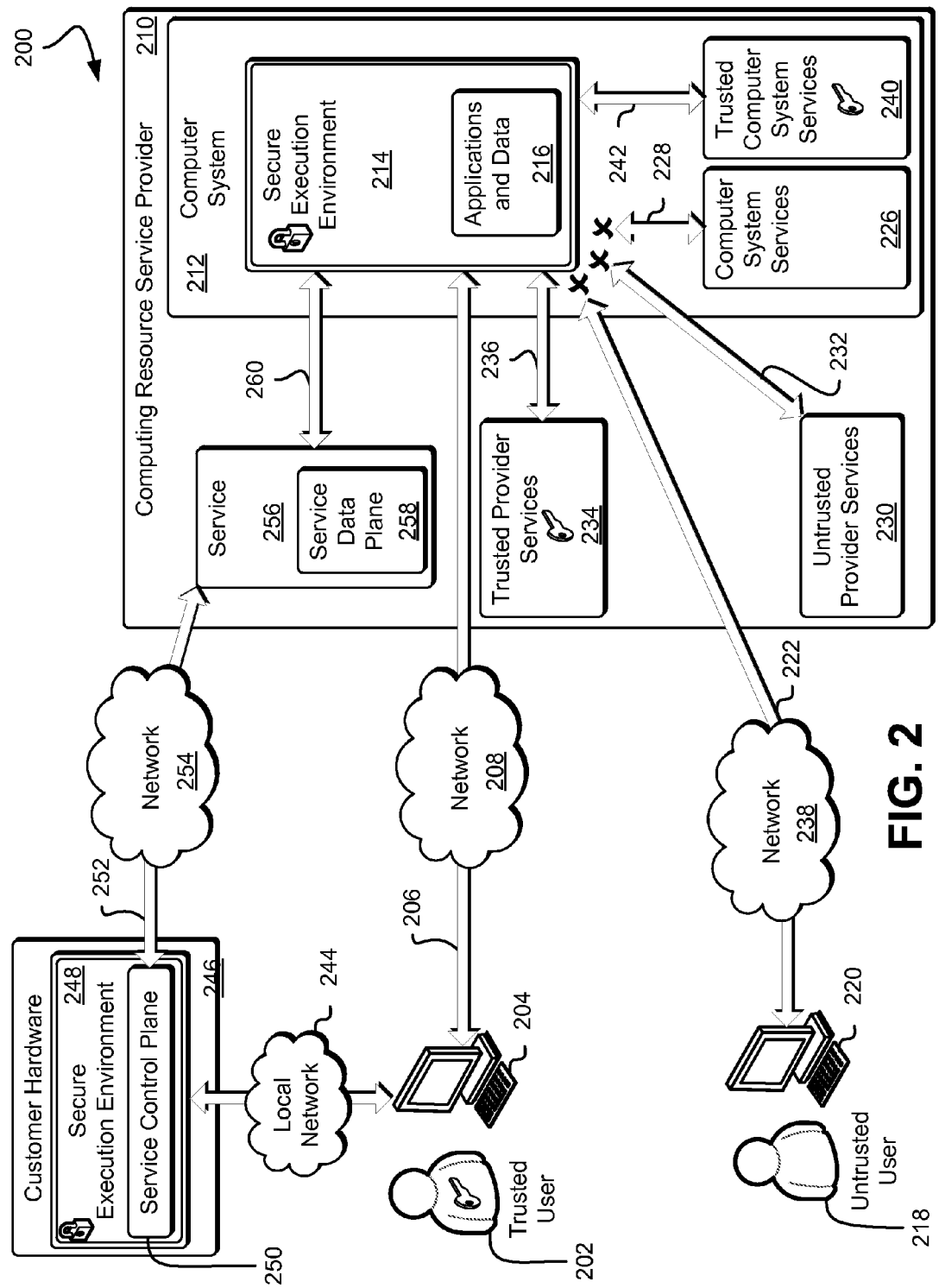
FIG. 2 illustrates an example environment where a control plane of a service may be securely instantiated within a secure execution environment in an environment provided by a third party in accordance with an embodiment.

FIG. 2 illustrates an example environment 200 where the control plane of a service may be securely instantiated within a customer-provided environment as described in connection with FIG. 1 and in accordance with an embodiment and where trusted users and trusted services may access functionality associated with a secure execution environment operating within a computing resource service provider. As used herein with respect to trusted users and trusted services, the terms "trusted" may be understood to refer to a degree of isolation between users and the secure execution environment or between services and the secure execution environment. A trusted user or service may have access to functionality associated with a secure execution environment such as, for example, an authorization to send data to and/or to receive data from a secure execution environment, to instantiate applications within a secure execution environment and/or some other such secure execution environment. An untrusted user or service may not have such access to functionality associated with the secure execution environment may be considered to be isolated from the secure execution environment. For example, a trusted user or service may receive and decrypt encrypted data from a secure execution environment via a mechanism such as an access key, certificate, or other such access mechanism provided by the secure execution environment. An untrusted user or service may not be able to decrypt such encrypted data, thereby keeping such data isolated from the untrusted user or service. Applications running within a secure execution environment may be considered trusted applications while other applications which may be isolated from the secure execution environment may be considered untrusted applications. Entities may also be considered untrusted or trusted with respect to one another. For example, a first secure execution environment that is not isolated from a second secure execution environment may be considered as trusted with respect to that second secure execution environment. Similarly, a first service which may be isolated from a second service may be considered as untrusted with respect to that second service. Other computer system entities may also be considered trusted or untrusted with respect to each other.

Secure and/or sensitive data as well as applications configured to access such secure and/or sensitive data may be protected from any access by any entity without the proper credentials by storing it in a secure execution environment. A secure execution environment provides a hardware-secured region within a computer system where data may be stored and applications may be executed, but such data and applications may not be accessible outside of the secure execution environment, even a trusted entity such as an operating system or a privileged user. Hardware within the computer system ensures that data stored within a secure execution environment and applications running within a secure execution environment are not accessible to any entity outside of the secure execution environment.

In some embodiments, a secure execution environment may be configured using dedicated hardware which may implement a variety of security assurance methods including, but not limited to, microcode instructions on a CPU, a trusted platform module (TPM) or other such security assurance methods. When a secure execution environment is created, the creator of the secure execution environment may receive an access key which may control access to the secure execution environment but which may not, in some embodiments, allow examination of the contents of the secure execution environment. Data may be installed in the secure execution environment and applications may be instantiated to run within the secure execution environment. Entities outside of the secure execution environment including, but not limited to, host operating systems, virtual machine operating systems, controlling domains, other privileged applications or privileged users may not access data stored in the secure execution environment, data sent to applications within the secure execution environment, the execution of the applications within the secure execution environment, the output of the applications within the secure execution environment or other such data and/or applications within the secure execution environment, while such data and/or applications remain within the secure execution environment. Data and/or results of applications may be accessed only if they are sent out from the secure execution environment and are typically encrypted prior to being sent out using one or more encryption keys. The encryption keys (and any corresponding decryption keys) may be made available to a user, process, module, application and/or other such entity with proper credentials associated with the secure execution environment.

A trusted user 202 may access functionality associated with a secure execution environment 214 operating on a computer system 212 as described herein above. A user may be or may become a trusted user 202 by virtue of having possession of an access key associated with a secure execution environment as described herein above. The access key may be provided to the trusted user 202 at the time that a secure execution environment is created, or as a result of having that key provided to the user or by some other such mechanism. The trusted user 202 may access functionality associated with the secure execution environment 214 using a connection 206 using a computer system client device 204. The computer system 212 may be operating within a computing resource service provider 210. The computing resource service provider 210 may provide a distributed, virtualized and/or datacenter environment within which one or more applications, processes, services, virtual machines and/or other such computer system entities may be executed. The trusted user 202 may be a person, or may be a process running on one or more remote computer systems, or may be some other computer system entity, user, or process.

The command or commands to initiate the connection 206 to the computer system 212 may originate from an outside computer system, or may originate from an entity, user or process in a remote network location, or may originate from an entity, user or process within the computing resource service provider, or may originate from a user of the computer system client device 204, or may originate as a result of an automatic process or may originate as a result of a combination of these and/or other such origin entities. The connection 206 used to connect to the computer system 212 may be a trusted connection, may be an encrypted connection, may be a general connection or may be a combination of these and/or other such connection types. In some embodiments, one or more commands may be used to first initiate a connection to the computing resource service provider. The command or commands to initiate the connection 206 to the computing resource service provider 210 may be sent to the computing resource service provider 210, without the intervention of the trusted user 202. The command or commands to initiate the connection 206 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 204, or may originate as a result of a combination of these and/or other such same and/or different entities.

The trusted user 202 may request connection to the computing resource service provider 210 via a connection 206 and, in some embodiments, via a network 208 and/or via entities associated therewith, such as servers connected to the network, either directly or indirectly. The computer system client device 204 that may request access to the computer system 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 208 may include a local network, an internal network, a public network such as the Internet, a wide-area network, a wireless network, a mobile network, a satellite network, a distributed computer system with a plurality of network nodes or a combination of these and/or other such networks. The network may also operate in accordance with various protocols such as, for example, Bluetooth, WiFi, cellular network protocols, satellite network protocols, and/or other such network protocols.

The computing resource service provider 210 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 210 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

A secure execution environment 214 may be operating within the computer system 212. The secure execution environment 214 may contain and/or otherwise administer access to one or more other secure execution environments and may also contain and/or otherwise administer applications and data 216 stored within the secure execution environment 214. As described herein above, the secure execution environment 214 may be configured to provide access to the secure execution environment functionality by trusted users and/or services so that, for example, those trusted users and/or services may access and use functionality associated with the secure execution environment 214 as described herein above. A user, client, service, process, application, module, or other such entity with access to a service and/or access to the resources served by that service may use that secure execution environment functionality to further secure data and/or applications associated with that service. Trusted users and/or services may use the secure execution environment functionality to create secure execution environments, populate secure execution environments with data and/or applications, obtain keys for decrypting results from secure execution environments, measure secure execution environments, start applications within secure execution environments retrieve data from secure execution environments and other such secure execution environment functionality. The trusted user 202 may connect to the secure execution environment 214 via the connection 206 or via an additional connection such as a dedicated connection established to connect to the secure execution environment 214. The additional connection may share one or more characteristics in common with the connection 206 as described herein above.

One or more trusted provider services 234 may access functionality associated with the secure execution environment 214 using one or more connections 236. Trusted provider services may be operating on computer systems within the computing resource service provider 210 environment. A provider service may become one of the trusted provider services 234 by virtue of having possession of an access key associated with a secure execution environment 214 as described herein above. Access keys may be provided to the trusted provider services 234 at the time that a secure execution environment is created, or as a result of having that key provided to the provider service or by some other such mechanism. For example, a provider service configured to provide database services may be configured to receive and store encrypted data from a secure execution environment 214. Such a database service may become a trusted provider service and may be provided with the access key so that the database service can receive encrypted data from the secure execution environment. The one or more connections 236 used to access functionality associated with the secure execution environment 214 may be trusted connections, may be an encrypted connections, may be a general connections or may be a combination of these and/or other such connection types.

In some embodiments, an untrusted user 218 may connect to the computer system 212 and/or to some other such service operating within the computing resource service provider 210 using a connection 222 and may connect to the computer system 212 and/or to some other such resource within the computing resource service provider 210 using a computer system client device 220. The untrusted user 218 may be a person, or may be a process running on one or more remote computer systems, or may be some other computer system entity, user, or process. A user may be an untrusted user 218 by virtue of not having possession of an access key associated with a secure execution environment 214. The command or commands to initiate the connection 222 to the computer system 212 and/or to some other resource within the computing resource service provider 210 may originate from an outside computer system and/or server, or may originate from an entity, user or process in a remote network location, or may originate from an entity, user or process within the computing resource service provider 210, or may originate from a user of the computer system client device 220, or may originate as a result of an automatic process or may originate as a result of a combination of these and/or other such origin entities.

The connection 222 used to connect to the computer system 212 and/or to some other resource within the computing resource service provider 210 may be a trusted connection, may be an encrypted connection, may be a general connection or may be a combination of these and/or other such connection types. The command or commands to initiate the connection 222 to the computer system 212 and/or to some other resource within the computing resource service provider 210 may be sent to the computer system 212, without the intervention of the untrusted user 218. The command or commands to initiate the connection 222 to the computer system 212 may originate from the same origin as the command or commands to connect to the computing resource service provider 210 or may originate from another computer system and/or server, or may originate from a different entity, user or process on the same or a different remote network location, or may originate from a different entity, user or process within the computing resource service provider, or may originate from a different user of a computer system client device 220, or may originate as a result of a combination of these and/or other such same and/or different entities.

The untrusted user 218 may connect to resources within the computing resource service provider 210 via a network 238 and/or via entities associated therewith, such as servers connected to the network, either directly or indirectly. The computer system client device 220 that may request access to the computer system 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. As described herein above, the network 238 may include a local network, an internal network, a public network such as the Internet, a wide-area network, a wireless network, a mobile network, a satellite network, a distributed computer system with a plurality of network nodes or a combination of these and/or other such networks. The network may also operate in accordance with various protocols such as, for example, Bluetooth, WiFi, cellular network protocols, satellite network protocols, and/or other such network protocols. In some embodiments, the network 208 may be the same as the network 238.

An untrusted user 218 may attempt to access functionality associated with the secure execution environment 214 using the connection 222 using the network 238 and may also attempt to access the applications and data 216 stored within the secure execution environment 214. The connection 222 used to connect to the secure execution environment 214 may be a trusted connection, may be an encrypted connection, may be a general connection, may be an untrusted connection or may be a combination of these and/or other such connection types. As indicated in the example illustrated in FIG. 2, the attempt by the untrusted user 218 to connect to the secure execution environment 214 may fail. In some embodiments, the attempt by the untrusted user 218 to connect to the secure execution environment 214 may fail at connection initiation, or may fail during key verification, or may fail when a secure execution environment command is attempted or may fail at some other such times. In some embodiments, an untrusted user 218 may have permission to perform a subset of activities or commands in connection with the secure execution environment 214 in accordance with one or more system policies. In some embodiments, an untrusted user 218 may be restricted from all access to the secure execution environment 214 and may also be restricted from all access to the applications and data 216 stored within the secure execution environment 214.

Computer system services 226 may attempt to access 228 functionality associated with the secure execution environment 214 and/or may attempt to access applications and data 216 stored therein. Computer system services 226 are other services running within the computer system 212. Computer system services 226 may include, but may not be limited to, applications, processes, modules, services, and/or other such computer system entities running within the computer system 212. Computer system services 226 may also include, but may not be limited to, host operating systems, guest operating systems, drivers, trusted services, controlling domains, applications started by trusted users and/or other such operational computer system entities running on the computer system 212. In some embodiments, one or more of the computer system services 226 may be trusted as a result of having possession of an access key associated with a secure execution environment 214 as described herein above. Such trusted computer system services may have access to the secure execution environment 214 and/or to applications and data 216 stored within the secure execution environment 214.

In some embodiments, one or more of the computer system services 226 may be untrusted as a result of not having possession of an access key associated with a secure execution environment 214 as described herein above. Such untrusted computer system services may not have access to functionality associated with the secure execution environment 214 and/or to applications and data 216 stored within the secure execution environment 214, or may have partial access to functionality associated with the secure execution environment 214, or may have partial access to applications and data 216 stored within the secure execution environment 214 or may have a combination of these and/or other such access levels. For example, one or more computer system services 226 may have permission to query the secure execution environment 214 and/or may have permission to request trusted status from the secure execution environment 214, but may not be granted any other permissions associated with the secure execution environment 214. In some embodiments, one or more of the computer system services may be trusted computer system services 240 and may be configured to have access to functionality associated with the secure execution environment 214 via connection 242.

One or more untrusted provider services 230 may attempt to access functionality associated with the secure execution environment 214 using one or more connections 232. As with trusted provider services 234, untrusted provider services 230 may be operating on computer systems within the computing resource service provider 210 environment. A provider service may be untrusted as a result of not having possession of an access key associated with a secure execution environment 214 as described herein above. As indicated in the example illustrated in FIG. 2, the attempt by one of the untrusted provider services 234 to connect to the secure execution environment 214 may fail at, for example, connection initiation, key verification, when a secure execution environment command is attempted or at some other such times. As with an untrusted user 218, untrusted provider services 230 may have permission to perform a subset of activities or commands in connection with the secure execution environment 214 in accordance with one or more system policies. In some embodiments, untrusted provider services 230 may be restricted from all access to functionality associated with the secure execution environment 214 and may also be restricted from all access to the applications and data 216 stored within the secure execution environment 214.

In some embodiments, the computer system services 226 and/or the untrusted provider services 230 may have access to the trusted provider services 234 as provided by the computing resource service provider 210. The trusted provider services 234 may be configured to provide access to functionality associated with the secure execution environment 214 and/or applications and data 216 stored within the secure execution environment 214 to other clients using a service such as a policy service described herein at least in connection with FIG. 1. As described herein above, the policy service may be configured to grant access rights, revoke access rights, access key services, provide key services to users and/or services or to provide other such functionality to users and entities such as the trusted user 202 or the trusted provider services 234 as well as to the untrusted user 218, the computer system services 226, the untrusted provider services 230 or other such users and/or or services associated with the computing resource service provider.

The trusted user 202 may also access functionality associated with a secure execution environment 248 operating on customer hardware 246 as described herein above. The secure execution environment 248 may contain and/or otherwise administer access to functionality associated with one or more other secure execution environments and may also contain and/or otherwise administer applications and data stored within the secure execution environment 248 as described herein above in connection with the secure execution environment 214. For example, the secure execution environment 248 may provide access by trusted users and/or services so that, for example, those trusted users and/or services may utilize the functionality associated with the secure execution environment 248. A user, client, service, process, application, module, or other such entity with access to a service and/or access to the resources served by that service may use that secure execution environment functionality to further secure data and/or applications associated with that service. In some embodiments, functionality associated with the secure execution environment 248 on customer hardware 246 may be accessed by the trusted user 202 via the device 204 using a network such as the local network 244. In some embodiments, device 204 may be the same as the customer hardware 246 and the secure execution environment 248 may be operating within the device 204.

As described herein above at least in connection with FIG. 1 and in accordance with an embodiment, a service control plane 250 associated with a service 256 may be operating within the secure execution environment 248 in order that the contents of the service control plane 250 may remain inaccessible by the customer hardware 246. In some embodiments, the trusted user 202 may have no access to functionality associated with the secure execution environment 248. In some embodiments, the trusted user 202 may have partial access to functionality associated with the secure execution environment 248 wherein such access may be determined by one or more system policies. In some embodiments, the trusted user 202 may have full access to functionality associated with the secure execution environment 248. An example of partial access to functionality associated with the secure execution environment is where the trusted user may be authorized to instantiate the secure execution environment and make other such secure execution environment operation API calls, but may not be authorized to send data to and/or receive data from the secure execution environment or the applications running thereon, including the contents of the service control plane 250.

The service control plane 250 may have access 252 to an associated service 256 running within a computing resource service provider 210 environment via a network 254. The network 254 may include a local network, an internal network, a public network such as the Internet, a wide-area network, a wireless network, a mobile network, a satellite network, a distributed computer system with a plurality of network nodes or a combination of these and/or other such networks. The network may also operate in accordance with various protocols such as, for example, Bluetooth, WiFi, cellular network protocols, satellite network protocols, and/or other such network protocols. In some embodiments the network 254 may be the same as the network 208 and/or may be the same as the network 238. In some embodiments, the local network 244 may also be the same as one or more of the network 254, the network 208, or the network 238.

In some embodiments, the service 256 may include a service data plane 258 which may be configured to receive requests and/or data from the service control plane 250 and may also be configured to respond to such requests by, for example, accessing other services within one or more computer environments and to obtain and transmit data back to the service control plane 250 operating within the secure execution environment 248. In some embodiments, the service 256 may be a trusted service such as the trusted provider services 234 and may have access 260 to functionality associated with the secure execution environment 214. In some embodiments, the service 256 may be an untrusted service such as the untrusted provider services 230 and may not have access to functionality associated with the secure execution environment 214. In some embodiments, the service 256 and/or the service data plane 258 may be operating within the computer system 212 and/or within the secure execution environment 214.

At least a part of the control plane of the service may be configured to operate within a domain provided by a customer of a computing resource service provider. For example, the control plane of a service may be configured to operate within a customer-provided datacenter, or within a customer-provided host machine, or within a customer-provided mobile device or within some other such customer-provided hardware. As described herein below, a service provided by a computing resource service provider may be one of one or more services configured to provide access to resources of a computer system including, but not limited to, data processing, data storage, applications, interfaces, permissions, security policies, encryption, and/or other such services.

A secure execution environment may be instantiated so that elements of a control plane of a service may be configured to operate within the secure execution environment by selecting one or more computer systems upon which to instantiate one or more secure execution environments. The one or more computer systems may be selected based on the availability of hardware capabilities within the computer system. For example, secure execution environment functionality may be provided to a host system by a specialized instruction set such as Intel® Software Guard Extensions (referred to herein simply as "Intel® SGX" or more simply as "SGX"), a module such as a trusted platform module ("TPM"), system microcode or combinations of these and/or other such provisions. A secure execution environment provided by a secure execution environment service may be provided on a selected computer system which supports such specialized instruction sets. In some embodiments, a secure execution environment may be provided as a service by selecting a computer system from a plurality of candidate systems which may be configured at least to support secure execution environment functionality.

Secure execution environment functionality may include functionality to create secure execution environments, destroy secure execution environments, measure (gather metrics from) secure execution environments, populate secure execution environments, generate keys, send data, receive data and/or other such functionality. Access to such secure execution environment functionality may be provided by a library, interface, webservice, application programming interface or some other such access methodology. For example, access to the secure execution environment functionality may requested using an application programming interface request such as a service application programming interface request. A service application programming interface request may be a request that may be sent to a secure execution environment service, which may be made using, for example, an API provided by the secure execution environment service or which may be sent to the secure execution environment service using some other such mechanism as described herein.

With access to the interface, a computer system such as a customer-provided computer system may provide that access to a user of a computer system as described herein below. As may be contemplated, the providers of secure execution environment functionality, the types of secure execution environment functionality and the methods of providing access to secure execution environment functionality described herein are merely illustrative examples and, as such, other providers of secure execution environment functionality, types of secure execution environment functionality and methods of providing access to secure execution environment functionality may be considered as within the scope of the present disclosure.

In an illustrative example, a host computer system may provide secure execution environment functionality via the Intel® SGX instruction set that may be enabled on the central processing unit ("CPU") of the host computer system, although the scope of the present disclosure extends to other such secure execution environment types. A controlling domain such as a hypervisor may be running on that host computer system and may be the controlling domain for one or more virtual machine ("VM") instances also running on that host computer system. An entity running on the host computer system such as the host operating system, a service running under the control of the host operating system, the controlling domain, a service running under control of the controlling domain, a guest operating system running on a VM instance, a service running on a VM instance or a combination of these and/or other such entities may provide an interface to the secure execution environment functionality. A user, client, service, module, or other such entity with access to a VM instance on the host computer system may use that interface to the secure execution environment functionality to, for example, create a secure execution environment, populate the secure execution environment, obtain keys and/or other such secure execution environment operations.

In some embodiments, the secure execution environment functionality may be provided as an application, process, module, or some other such entity and may be implemented as a single instance on a host machine providing secure execution environment functionality for one or more VM instances. In some embodiments, there may be multiple instances of the application, process, module or some other such entity configured to provide secure execution environment functionality operating on the host machine. In some embodiments, the application, process, module or some other such entity configured to provide secure execution environment functionality may be operating within a computing resource service provider environment, or may be operating within a customer-provided environment or may be operating on a combination of these and/or other such environments. An application, process, module, or some other such entity configured to provide secure execution environment functionality may also operate on a remote machine and/or may provide secure execution environment functionality in a distributed and/or hierarchical manner such as, for example, by operating on multiple machines in a cooperative manner. An application, process, module or some other such entity configured to provide secure execution environment functionality may start automatically when a machine and/or a virtual machine is started or may be started as needed when, for example, a client entity requests access to the secure execution environment functionality.

As described herein, a computing resource service provider may provide a variety of services to the customers and the customers may communicate with the computing resource service provider via an interface, which may be a web services interface or any other type of customer interface. The services may include control planes, data planes and/or other such operational elements as described herein above. Each service of the services provided by a computer resource service provider may have its own interface and subsets of the services may have corresponding individual interfaces in addition to or as an alternative to a common interface. A customer may communicate with the services through a network, whereby the network may be a communication network, such as the Internet, an intranet, an internet service provider ("ISP") network and/or some other such network as described herein below.

Figure 3:
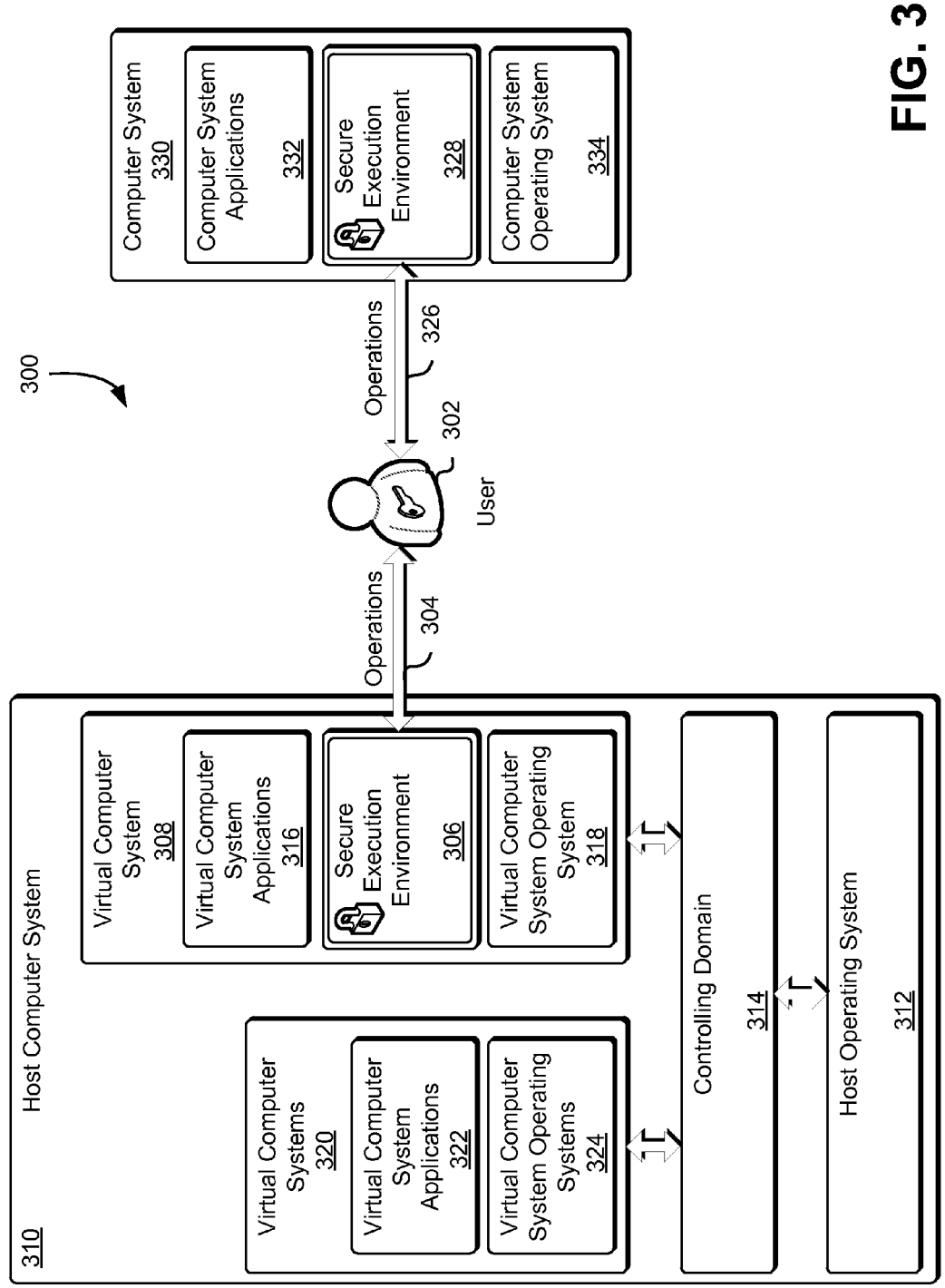
FIG. 3 illustrates an example environment where one or more secure execution environment operations may be performed in accordance with an embodiment.

FIG. 3 illustrates an example environment 300 where a user may perform one or more secure execution environment operations on secure execution environments as described in connection with FIG. 2 and in accordance with an embodiment. A user 302 may execute one or more secure execution environment operations 304 associated with a secure execution environment 306 on a virtual computer system 308. The virtual computer system 308 may be one of one or more virtual computer systems operating on a host computer system 310. The host computer system 310 may be operating within a computing resource service provider environment such as the computing resource service provider 210 as described in connection with FIG. 2 and in accordance with an embodiment. The host computer system 310 may also be operating within a customer-provided computer system environment and may, for example, be the same as the customer hardware 246 also as described in connection with FIG. 2 and in accordance with an embodiment. The secure execution environment 306 may be administered by one or more applications, programs, modules and/or other such entities described herein at least in connection with FIG. 2 and in accordance with an embodiment. The secure execution environment 306 may include applications and data such as the applications and data 216 described herein at least in connection with FIG. 2 and in accordance with an embodiment.

The user 302 may also execute one or more secure execution environment operations 326 associated with a secure execution environment 328 on a computer system 330. The computer system 330 may be one of one or more computer systems such as the computer systems described herein above. The secure execution environment 328 may be administered by one or more applications, programs, modules and/or other such entities described herein at least in connection with FIG. 2 and in accordance with an embodiment. The secure execution environment 328 may include applications and data such as the applications and data 216 and/or such as the service control plane 250 as described in connection with FIG. 2 and in accordance with an embodiment. The applications, processes, modules and/or other such entities that are configured to administer the secure execution environment 306 may be the same as those that are configured to administer the secure execution environment 328. The secure execution environment operations 304 and the secure execution environment operations 326 may include one or more secure execution environment operations for administering secure execution environments and/or the applications and/or data contained therein. Secure execution environment operations include, but may not be limited to, creating secure execution environments, destroying secure execution environments, measuring secure execution environments, populating secure execution environments, growing secure execution environments, shrinking secure execution environments, starting secure execution environments, stopping secure execution environments, describing secure execution environments, updating secure execution environments, generating keys for secure execution environments, sending data to secure execution environments, receiving data from secure execution environments, starting applications within secure execution environments, stopping applications within secure execution environments and/or other such secure execution environment operations.

For example, a user may execute a secure execution environment operation to create a secure execution environment such as the secure execution environment 306 within the virtual computer system 308 on the host computer system 310. The user, which may now be a trusted user as a result of acquiring an access key as a result of creating the secure execution environment as described herein above, may then install and start an application such as a secure execution environment agent (as described herein above) on the secure execution environment which may, in turn, upload data and/or other applications within the secure execution environment. The secure execution environment agent may be configured to decrypt uploaded data and/or applications and may also be configured to validate such uploaded data and/or applications by, for example, providing a certificate or an attestation associated with the validity of the uploaded data and/or applications. The secure execution environment agent may also be configured to provide functionality to instantiate a service control plane such as the service control plane 250 as described in connection with FIG. 2. The secure execution environment may also dynamically allocate resources associated with the secure execution environment such as, for example, resources associated with a service control plane. As resource needs for the service control plane may increase or decrease, the size of the secure execution environment and/or the resources associated with the secure execution environment may be increased or decreased as required, using one or more other secure execution environment operations. When the secure execution environment is no longer needed, it may be depopulated and/or destroyed as needed, using one or more other secure execution environment operations. As may be contemplated, the secure execution environment operations described herein are illustrative examples and other such secure execution environment operations may be considered as within the scope of the present disclosure.

As described herein above, a secure execution environment such as secure execution environment 306 or secure execution environment 328 may not allow access to functionality associated with the secure execution environments by any entity except trusted entities as described in connection with FIG. 2 and in accordance with an embodiment. For example, entities on the virtual computer system 308 such as virtual computer system applications 316, virtual computer system operating system 318 or other such entities may not access applications or data stored within secure execution environment 306 unless they are trusted by the secure execution environment 306. Similarly, other entities on the host computer system 310 including, but not limited to, other virtual computer systems 320, other virtual computer system applications 322, other virtual computer system operating systems 324 also may not access applications or data stored within secure execution environment 306 unless they are trusted by the secure execution environment 306. Additionally, entities that have privileged access to the host computer system 310 such as controlling domain 314 or host operating system 312 also may not access applications or data stored within secure execution environment 306 unless they are trusted by the secure execution environment 306. Similarly, entities operating on computer system 330 such as computer system applications 332 and entities that have privileged access to the computer system 330 such as computer system operating system 334 also may not access applications or data stored within secure execution environment 328 unless they are trusted by the secure execution environment 328. In the example environment illustrated in FIG. 3, a connection is illustrated between a user 302 and a secure execution environment 306 and another connection is illustrated between the user 302 and a secure execution environment 328. In some embodiments a secure execution environment such as the secure execution environment 306 may be directly connected to a secure execution environment such as the secure execution environment 328 without an intervening user, service, process, application, and/or other such entity. In such embodiments, the secure execution environment 306 may be trusted by (not isolated from) the secure execution environment 328 and in such embodiments, the secure execution environment 328 may be trusted by (not isolated from) the secure execution environment 306.

Figure 4:
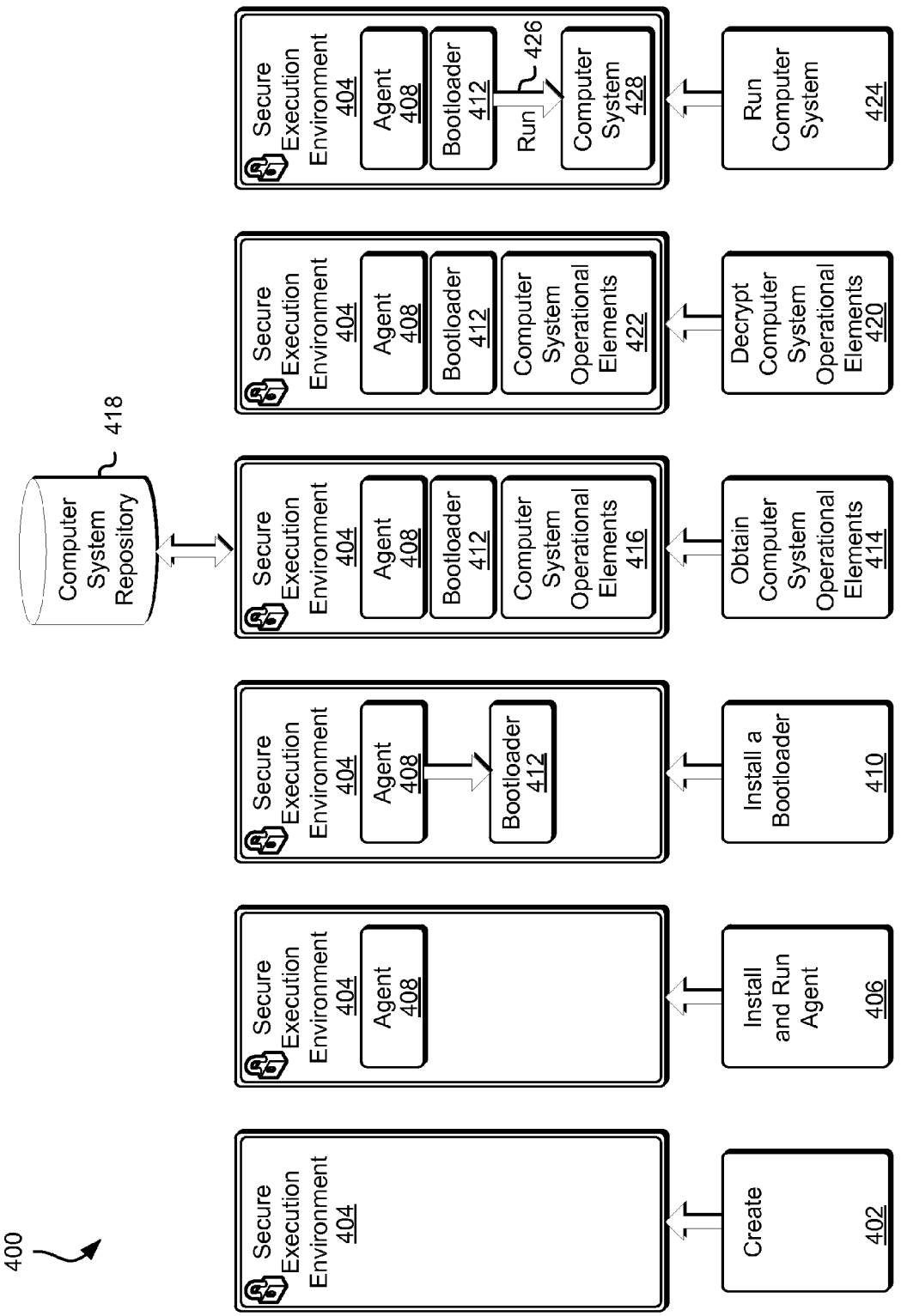
FIG. 4 illustrates an example environment where secure execution environment operations may be executed on a secure execution environment operating as a service in accordance with an embodiment.

FIG. 4 illustrates an example environment 400 where secure execution environment operations may be executed on a secure execution environment operating as a service as described in connection with FIG. 2 and in accordance with an embodiment. A secure execution environment operation to create a secure execution environment 402 may be sent to one or more applications, processes, modules, and/or other such entities configured to perform secure execution environment operations as described in connection with FIG. 2 and in accordance with an embodiment. As a result of the secure execution environment operation to create a secure execution environment 402, a secure execution environment 404 may be created and made available to users and/or services within a computing resource service provider environment. A secure execution environment operation to install and run a secure execution environment agent 406 may then be executed on the secure execution environment 404 and as a result of that operation, a secure execution environment agent 408 may then be instantiated within the secure execution environment 404.

In some embodiments, the secure execution environment agent 408 may be configured to perform one or more secure execution environment operations on the secure execution environment 404 so that the secure execution environment 404 may be further configured to provide desired functionality. The secure execution environment agent 408 may be configured to perform the one or more operations as a result of receiving one or more external commands, or may be configured to perform the one or more operations as a result of one or more commands specified by the secure execution environment agent or may be configured to perform the one or more operations as a result of a combination of external commands and commands specified by the secure execution environment agent. For example, the secure execution environment agent 408 may execute a secure execution environment operation to install a bootloader 410. In some embodiments, the bootloader 412 installed by the secure execution environment operation to install a bootloader 410 may be configured to locate and install one or more computer system operational elements. As used herein, the term "computer system operational elements" may refer to computer system applications, computer system data, computer system data associated with computer system applications, programs, modules, sets of executable instructions or combinations of these and/or other such elements. For example, the computer system operational elements may include the service control plane such as the service control plane 102 described herein above at least in connection with FIG. 1 and in accordance with an embodiment. In some embodiments, the bootloader 412 may be a separate application from the secure execution environment agent 408. In some embodiments, the bootloader 412 may be the same application as the secure execution environment agent 408.

The secure execution environment agent 408 and/or the bootloader 412 may be further configured to perform one or more secure execution environment operations to locate and obtain computer system operational elements 414. The computer system operational elements 416 may be obtained from a computer system repository 418 which may contain a plurality of such computer system operational elements including applications, data, and/or other such computer system operational elements. In some embodiments, the computer system operational elements 416 may be obtained as a single block of data which may specify the computer system. In some embodiments, the computer system operational elements 416 may be obtained as a plurality of blocks of data, each block of data specifying one or more parts of the computer system such as data, applications, drivers, network connections, secure network connections, resource requirements, policies, and/or other such computer system operational elements. In some embodiments, the computer system operational elements 416 may be retrieved from the computer system repository 418 in response to receiving one or more commands. The one or more commands may be issued by the agent 408, the bootloader 412, or some other such entity. The one or more commands may be issued as webservice commands, API calls, library calls, or some other such command methodology.

Retrieving the computer system operational elements from the computer system repository 418 may include retrieving computer system images (e.g., kernel images) directly or using a bootloader as described herein above. The computer system operational elements may include computer system images which may include a secure execution environment or may include computer system images which may be configured to create a secure execution environment. The computer system operational elements may include specifications for processes configured to create a secure execution environment using, for example, a device driver and/or or a kernel module. As may be contemplated, the types of computer system operational elements as described herein, the methods for retrieving those computer system operational elements as described herein and the locations that those computer system operational elements are retrieved from as described herein are illustrative examples and other such types of computer system operational elements, methods for retrieving those computer system operational elements and the locations that those computer system operational elements are retrieved from may be considered as within the scope of the present disclosure.

In some embodiments, the computer system operational elements 416 may be encrypted. In such embodiments, the secure execution environment agent 408 and/or the bootloader 412 may be configured to perform one or more operations to decrypt the computer system operational elements 420 to produce the decrypted computer system operational elements 422. Finally, the secure execution environment agent 408 and/or the bootloader 412 may be configured to perform one or more operations to run one or more applications associated with the computer system 424. In some embodiments, the bootloader 412 may execute a command instructing the computer system 428 to run 426, thereby starting the one or more applications associated with the computer system 428.

A secure execution environment agent may be installed, instantiated or launched on a computer system (e.g., within a secure execution environment on the computer system) to provide secure execution environment functionality. The secure execution environment agent may be installed, instantiated or launched by the computer system. In some embodiments, the secure execution environment agent may be installed, instantiated or launched on the computer system by a second computer system which may be configured to install, instantiate or launch a secure execution environment agent on the computer system. In some embodiments, the secure execution environment agent may be installed, instantiated or launched on the second computer system in response to a request by the computer system. In some embodiments, the secure execution environment agent may be code that may be verified by the computing resource service provider, or may be verified by the customer, or may be verified by a third-party or may be verified by some other such entity. The secure execution environment agent may also be configured to provide one or more other measurements of the contents of the secure execution environment to the customer that created the secure execution environment so that, for example, secondary verifications of the integrity of the secure execution environment may performed by the customer, the computing resource service provider, a third party or some other such entity.

The one or more measurements (also referred to herein as "cryptographic measurements") may be evaluated within the secure execution environment or may be sent outside of the secure execution environment. Secure execution environments may be configured so that measurements are performed entirely within a secure portion of the CPU and may also be configured so that the measurements are signed by secret material provided by the CPU such as, for example, by microcode running on the CPU. In this way, measurements may be verified as correct by users using functionality provided in association with the secure execution environment. Measurements may be verified by, for example, an API which may provide information usable to determine the state of a processor wherein such information may be cryptographically verified as having been validated by a trusted entity such as the processor, a trusted platform module or some other such trusted entity. In some embodiments, a measurement may be unique to the version of the microcode. In some embodiments, a measurement may be based at least in part on a per-processor key which may specify a certificate. In some embodiments, the certificate may be based at least in part on a common parent such as, for example, a certificate from a computer system, a computer system environment, a computer system provider and/or some other such common parent. The results may be sent outside the secure execution environment by first encrypting the results using an encryption key generated within the secure execution environment and then by sending the one or more encrypted results to the customer, or to a data store, or to a database, or to a service such as a webservice or to some other such storage location.

In some embodiments, the secure execution environment agent may be configured to locate and/or instantiate a bootloader application within the secure execution environment which may, in turn, be configured to locate and/or instantiate the applications and/or data to be installed within the secure execution environment by the bootloader. A bootloader is an application, process, module or other such entity configured to locate and instantiate executable code and/or data within a computer system. The secure execution environment agent may first receive the bootloader, may then decrypt the bootloader if it had been previously encrypted and may finally verify the bootloader using one or more measurements of the bootloader. In some embodiments, the secure execution environment agent may be configured to provide measurements of the bootloader once it has been instantiated within the secure execution environment by pausing and/or otherwise freezing the secure execution environment and obtaining one or more measurements from specialized instructions running on the host CPU, which may in turn be verified within the secure execution environment or may be sent outside the secure execution environment in encrypted form, to be stored and/or validated. In some embodiments, the secure execution environment agent may implement the bootloader functionality itself. In some embodiments, the bootloader functionality may be placed within the secure execution environment upon instantiation.

The applications and/or data to be installed within the secure execution environment by the bootloader may include any applications and/or data as may be required by the customer. The bootloader may be configured to locate and instantiate a control plane for a service provided by a computing resource service provider within a computing environment provided by a customer of the computing resource service provider. For example, a customer may require functionality to manage one or more cryptographic keys within the secure execution environment relating to access to certain encrypted data stored within the computer system. The bootloader may instantiate the control plane of a service for managing such keys which may be configured to respond to requests for new keys by generating such keys using a sensitive key generation algorithm. The encrypted cryptographic keys may be generated within the secure execution environment and may be provided to a data plane of a service which may be configured to encrypt such keys to provide them to authorized users. The algorithm for generating the cryptographic keys may remain safe from being examined by any other entity within the computer system, thus ensuring the security of the cryptographic keys.

Applications and/or data installed in a secure execution environment may include applications to provide access to and/or to process other types of sensitive data. For example, applications may be installed to emulate hardware, provide network connections, provide access to restricted data types, provide other encryption methodologies and/or other such application types. Such applications may be instantiated as services and, in some embodiments, control planes of such services may be instantiated within secure execution environments. In some embodiments, the control planes for such applications or services may be migrated from controlling domains (e.g., a hypervisor) or from a host operating system, or from secured computer system domains or from combinations of these and/or other such computer system entities. In some embodiments, the control planes for such applications or services may be converted from non-secure execution environment versions to secure execution environment versions by altering one or more aspects of the application or service.

For example, a payment processing application running as a web service on a computer system such as a computer system provided by a computing resource service provider may be converted to run as a secured service within a secure execution environment by first suspending the application, then measuring the application, then selecting the control plane of the application, then converting the control plane to enable access to secure execution environment functionality, then encrypting the converted control plane, then migrating the control plane to the secure execution environment and finally by decrypting and restoring the control plane to run within the secure execution environment and to access the data plane outside of the secure execution environment. A service may be an application that is configured to run within a computer environment and that is configured to provide services to one or more client applications using an interface such as a web interface of a network such as the Internet. The client applications may operate within client secure execution environments (i.e., secure execution environments configured to host client applications). Such applications operating within secure execution environments may be referred to herein as secure execution environment applications. As may be contemplated, the types of applications that may run within a secure execution environment as secured control planes and/or as secured data planes for services described herein are merely illustrative examples and other types of applications running within secure execution environments as secured control planes and/or as secured data planes for services may be considered as within the scope of the present disclosure.

Figure 5:
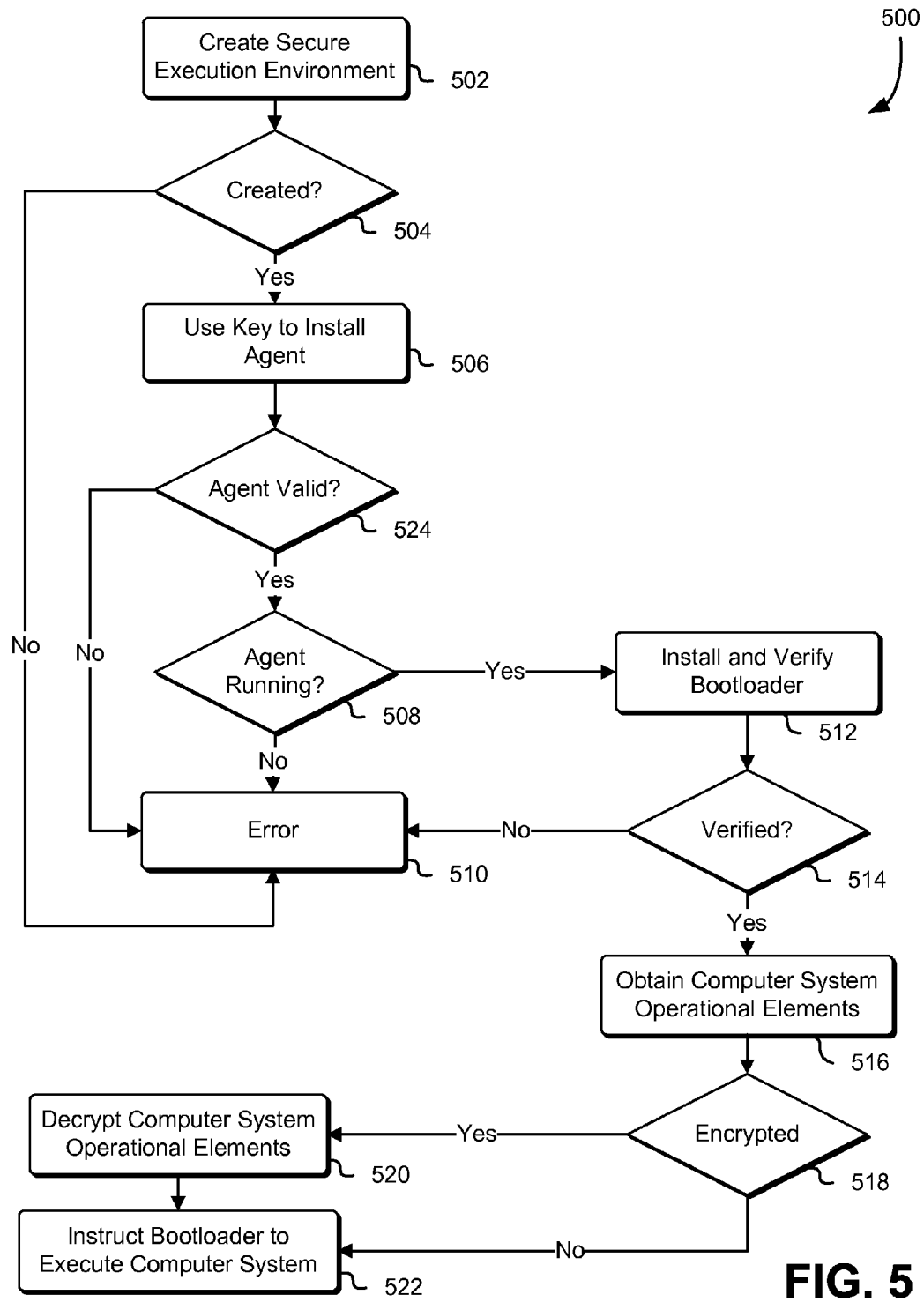
FIG. 5 illustrates an example process for instantiating and populating a secure execution environment in accordance with an embodiment.

FIG. 5 illustrates an example process 500 for instantiating and populating a secure execution environment as described in connection with FIG. 2 and in accordance with an embodiment. One or more applications, processes, modules and/or other such entities associated with a secure execution environment such as the secure execution environment 214 described herein at least in connection with FIG. 2 may perform at least a portion of the process illustrated in FIG. 5. A secure execution environment agent such as the secure execution environment agent 408 described herein at least in connection with FIG. 4 may perform at least a portion of the process illustrated in FIG. 5. A bootloader such as the bootloader 412 described herein at least in connection with FIG. 4 may perform at least a portion of the process illustrated in FIG. 5. Other entities operating with a computer system environment may also perform at least a portion of the process illustrated in FIG. 5 including, but not limited to, services, applications, modules, processes, operating system elements, virtual machine elements, network hardware, controlling domain elements (e.g., a hypervisor) or combinations of these and/or other such entities operating within the computer system environment.

An application, process, module, and/or other such entity configured to provide secure execution environment functionality may receive a command to create a secure execution environment 502. The secure execution environment may be created as described herein above and, if successfully created 504, the secure execution environment key may be used to install a secure execution environment agent 506 such as the secure execution environment agent 408 described herein at least in connection with FIG. 4 and in accordance with an embodiment. After the secure execution environment agent is installed, the secure execution environment may attempt to determine whether the agent is valid 524 by providing one or more measurements of the contents of the secure execution environment. If the secure execution environment is not successfully created, installed, executed and validated, the application, process, module and/or other such entity configured to provide secure execution environment functionality may, in some embodiments, enter an error state 510 which may be reported to one or more users, services, processes and/or other such computer system entities. In some embodiments, the validity of the secure execution environment may be measured at one or more points during the secure execution environment instantiation process illustrated in FIG. 5. For example, the secure execution environment validity may be measured after instantiation, installation of the agent, installation of other applications and/or at other such times during instantiation.

If the secure execution environment agent is successfully created, validated and is running 508, the application, process, module and/or other such entity configured to provide secure execution environment functionality may then direct the secure execution environment agent to install and verify a bootloader 512 which may then, if verified 514, obtain computer system operational elements 516 to instantiate applications and/or data within the secure execution environment. As described herein above, the computer system operational elements may include a service control plane such as the service control plane 102 described herein at least in connection with FIG. 1 and in accordance with an embodiment. If the bootloader is not successfully verified 514, the application, process, module, and/or other such entity configured to provide secure execution environment functionality may also enter an error state 510 which may be reported to one or more users, services, processes and/or other such computer system entities. The application, process, module and/or other such entity configured to provide secure execution environment functionality, the secure execution environment agent or the bootloader may then determine whether the computer system operational elements are encrypted 518 and if so, may decrypt the computer system operational elements 520. Finally, the secure execution environment agent may instruct the bootloader to execute the computer system 522 by, for example, starting one or more applications within the secure execution environment. In some embodiments, the secure execution environment agent and/or the bootloader may continue to obtain computer system operational elements 516 and, if encrypted 518, decrypt the computer system operational elements 520 before causing them to execute until the computer system is complete.

As described herein, a secure execution environment agent may be configured to provide one or more measurements to validate the secure execution environment and the contents of the secure execution environment. These measurements may be based at least in part on measurements obtained from the host computer system hardware such as, for example, measurements obtained from the SGX instructions running on the CPU or instructions obtained from a TPM. The secure execution environment may be more accurately measured if the secure execution environment has been paused, or frozen or placed into some known state. A secure execution environment may be paused, or frozen or placed into some known state by halting the execution of applications running within the secure execution environment and/or by placing those applications in a certain determined state. Pausing and/or freezing applications and/or placing them in a certain determined state may allow external verification that a secure execution environment has not been tampered with by, for example, comparing the measurements to some known values. Measurements may, in some embodiments, include verification and/or validation that the measurement functionality was performed by a trusted, verified, and/or validated source. For example, measurements performed by Intel® SGX instructions running on an Intel® CPU may be verified as coming from a genuine Intel® processor and may be signed by that processor as genuine, with the signature being verifiable as such. Measurements coming from a TPM may include a similar verifiable signature of the measurements, with an assurance that the measurements were performed by the TPM and/or a process running thereon.

Figure 6:
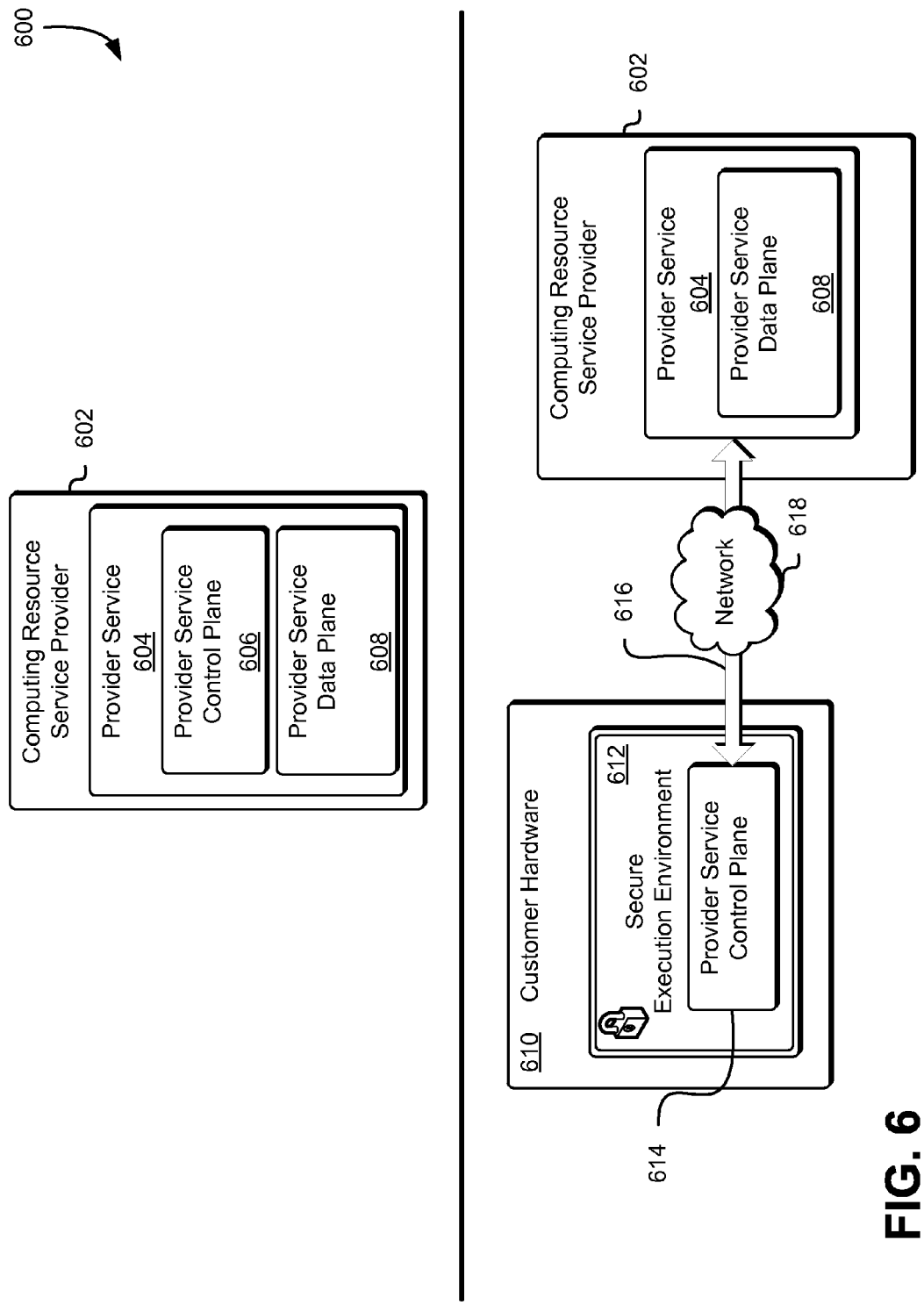
FIG. 6 illustrates an example environment where a provider service control plane may be migrated to third party hardware in accordance with an embodiment.

FIG. 6 illustrates an example environment 600 where a provider service control plane may be migrated to customer hardware as described in connection with FIG. 1 and in accordance with an embodiment. A provider service 604 running with a computing resource service provider environment 602 may include a provider service control plane 606 and a provider service data plane 608 as described in connection with FIG. 1 and in accordance with an embodiment. In some embodiments, a request to instantiate at least a subset of the functionality associated with the provider service control plane 606 on customer hardware 610 may be received. The request may be issued by a user, process, service, application, module, and/or some other such module operating within a computer system and may be a command, API call, library call, message, or some other such request format. As a result of such a request, a secure execution environment 612 may be instantiated within the customer hardware 610 as described in connection with FIG. 4 and in accordance with an embodiment.

In some embodiments, prior to instantiating a secure execution environment 612 in the target hardware (e.g., the customer hardware 610), it may first be determined whether the target hardware has capabilities required to support the secure execution environment. The target hardware may be verified by examining capabilities associated with the hardware to determine whether resources are available within the target hardware to support the secure execution environment. For example, the ability to instantiate a secure execution environment that is secured by SGX instructions may be determined by querying the CPU of the target hardware to verify that such instructions are available. Similarly, the ability to instantiate a secure execution environment that is secured by a TPM may be determined by querying for the ability of a TPM within the target hardware. In some embodiments, verifying the ability to instantiate a secure execution environment may include instantiating software within the target hardware where such software is configured to query the target hardware. In some embodiments, the software that determines the availability of hardware such as an SGX-enabled CPU and/or a TPM module may also generate a score such as a suitability score wherein the suitability score may be based at least in part on an amount of security that may be provided by the target hardware. The suitability score may also be based at least in part the availability of one or more other resources associated with the target hardware which may be used to instantiate the secure execution environment. The other resources may include, but may not be limited to, CPU cycles, system memory, system storage, network bandwidth, and/or other such system resources. As may be contemplated, the methods and metrics used to determine the suitability of target hardware for supporting a secure execution environment described herein are illustrative examples and other such methods and metrics may be considered as within the scope of the present disclosure.

As described herein above, the target hardware may include any hardware that is capable of supporting the secure execution environment and that is capable of securing the control plane. For example, the target hardware may include any device or equipment configured to execute instructions for performing data computation, manipulation or storage tasks, such as a computer system, a server, tablet computers, smart phones, mobile devices, wearable devices and/or other such hardware. In some embodiments, the secure execution environment 612 may be instantiated on any available hardware that is available. For example, a customer of a computing resource service provider may have hardware that is available at certain times of the day and which may be made available to the computing resource service provider to instantiate service elements (e.g., a service control plane) for computing resource service provider services.

After the secure execution environment 612 has been instantiated within the customer hardware 610 the subset of the functionality associated with the provider service control plane 614 may be instantiated within the secure execution environment 612 on the customer hardware 610 as described in connection with FIG. 4 and in accordance with an embodiment. In some embodiments, the provider service control plane 614 may be configured to connect 616 to the provider service 604 within the computing resource service provider environment 602 via a network 618 such as the network 208 described herein at least in connection with FIG. 2 and in accordance with an embodiment. In such embodiments, the connection between the provider service control plane 614 and the provider service 604 may be an encrypted and/or trusted connection.

The subset of the functionality associated with the provider service control plane 614 may include some or all of the functionality associated with the provider service control plane 606. For example, the control plane of a provider service may be configured to provision, place, start, verify, stop, and remove VM instances within computer systems. The subset of the functionality associated with the provider service control plane 614 may include only the functionality to start VM instances so that the provider service control plane 614 may be configured to receive requests from the provider service 604 that include previously determined provisioning and placement information. In such an embodiment, the functionality to provision, place, verify, stop, and remove VM instances may remain with the provider service 604. A more complete subset of the functionality associated with the provider service control plane 614 may add functionality to, for example, stop VM instances, or to provision VM instances or to verify VM instances. In some embodiments, such more complete subsets of the functionality associated with the provider service control plane 614 may be instantiated in multiple secure execution environments such that a first subset of the subset of the functionality associated with the provider service control plane may be instantiated in a first secure execution environment and second subset of the subset of the functionality associated with the provider service control plane may be instantiated in a second secure execution environment.

In some embodiments, the subset of the functionality associated with the provider service control plane 614 may include functionality to store data within the secure execution environment 612 and to only release such data to the customer hardware 610 as a result of receiving one or more requests from a service operating within the computing resource service provider. For example, an application provided by the computing resource service provider may be operating on the customer hardware 610. Such an application may be operating within the secure execution environment 612 or may be operating outside of the secure execution environment 612. The application may be configured to connect to a service operating within the computing resource service provider environment 602 to, for example, obtain data associated with the application. The data may only be made available to the application upon request, or if a request key is provided, or if some other event (e.g., a payment) is received by the service. In such an embodiment, the subset of the functionality associated with the provider service control plane 614 may be configured to retrieve the data from the computing resource service provider service prior to receiving the request and/or event and may then be configured to provide the data to the application by, for example, streaming the data to the application in an encrypted form that the application can decrypt. The subset of the functionality associated with the provider service control plane 614 may further limit the availability of the application to decrypt the data by, for example, changing the encryption key and by reserving access to decryption credentials until a further event is received from the service.

As used herein with respect to the one or more services which may operate on computer systems, the untrusted services which may not be authorized to access functionality associated with a secure execution environment, the one or more secured services which may run on the computer system (within the controlling domain and/or within the secure execution environment) and/or the one or more trusted services which may be authorized to access functionality associated with a secure execution environment, the term "services" may refer to one or more processes, programs, applications, modules and/or other such computer system entities which may be configured to access resources associated with computer systems and/or may be configured to provide such access to other such services.

The computing resource service provider may also provide various computing resource services to its customers individually or in a combination of services as a distributed computer system. These computing resource services may also include control planes, data planes and/or other such operational elements as described herein above. The services provided by the computing resource service provider may include services such as virtual computer system services, block-level data storage services, cryptography services, on-demand data storage services, notification services, authentication services, policy management services, task services and/or other such services. Not all embodiments described herein include all the services described and additional services may be provided in addition to or as an alternative to services explicitly described herein.

In some embodiments, the services may be configured with one or more interfaces that enable a client to submit requests via, for example, appropriately configured API calls to the services. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block level data storage service). Each of these services may include control planes, data planes and/or other such operational elements. Each of the service interfaces may also provide secured and/or protected access to each other via encryption keys and/or other such secured and/or protected access methods, thereby enabling secure and/or protected access between them. Collections of services operating in concert as a distributed computer system may have a single front-end interface and/or multiple interfaces between the elements of the distributed computer system.

As an example, a computing resource service provider may provide access to computer systems using a service such as a virtual computer system service that may be a collection of computer resources configured to instantiate VM instances on behalf of a customer. The customer may interact with the virtual computer system service to provision, place and operate VM instances that are instantiated on physical computer devices. The VM instances may be used for various purposes, such as to operate as servers supporting a website, to operate business applications or, generally, to serve as compute power for the customer. A service such as virtual computer system service may include control plane and/or data plane operational elements which may include sensitive data and/or algorithms related to, for example, the provisioning and placement of VM instances. Such algorithms may be considered proprietary and the provider of such a service may wish to keep such sensitive data and/or algorithms secure from privileged users and applications when such services are deployed on customer-provided computer system environments.

A computer system may be a distributed system with a plurality of hosts, or may be a single system with a plurality of virtual machine (VM) instances, or may be a networked combination of such systems or may be a combination of these and/or other such systems. Such systems may be operating within a computing resource service provider environment and/or may also be operating within an environment provided by a customer of a computing resource service provider. A computer system may provide access to a plurality of users, customers, modules, applications, services, processes, programs, operating systems, controlling domains and/or other such computer system entities. Some of the access provided by the computer system to these entities may include providing access to sensitive applications and/or sensitive data as described herein above. A computer system may also provide a plurality of data storage regions including, but not limited to, memory, disk storage, virtual memory, virtual disk storage, and other such storage regions. Consequentially, some of the data storage regions provided by the computer system may be configured to store sensitive data.

A virtual computer system service may be used by a computing resource service provider for providing computer system resources for customers. The virtual computer system service may provide such computer system resources by instantiating VM instances on physical hardware. The physical hardware may include physical hosts which may include any device or equipment configured to execute instructions for performing data computation, manipulation, or storage tasks, such as a computer or a server. Physical hardware may also include computer systems, laptops, tablet computers, smart phones, mobile devices, wearable devices, and/or other such physical hardware. A physical host may be equipped with any needed processing capability including one or more processors, such as a CPU, a graphics processing unit (GPU) or a digital signal processor (DSP), memory, including static and dynamic memory, buses and input and output ports that are compliant with any handshaking, communications or data transfer protocol. The physical hardware may also implement specialized instructions such as, for example, SGX instructions, TPM instructions, or the like. The physical hardware may also include storage devices, such as storage disks and tapes, networking equipment and the like.

A virtualization layer on the physical hardware may enable the physical hardware to be used to provide computational resources upon which one or more virtual hosts may operate. The virtualization layer may be any device, software, or firmware used for providing a virtual computer platform for the virtual hosts. The virtual computer platform may include various virtual computer components, such as one or more virtual CPUs, virtual memory, virtual devices and the like. The virtual hosts may be provided to the customers of the computing resource service provider and the customers of the computing resource service provider may run operating systems, applications and/or other such computer system entities on the virtual host. The virtualization layer may be implemented as a controlling domain such as a hypervisor.

As described herein above, a host computer system may provide secure execution environment functionality via instructions enabled on the CPU of the host computer system. The secure execution environment functionality may be provided to various other services running on the host computer system such as described herein above. For example, a virtual computer system service running on the host computer system may access the secure execution environment functionality to provide that functionality to VM instances running under control of the virtual computer system service. Similarly, other services including, but not limited to, block-level data storage services, cryptography services, on-demand data storage services, notification services, authentication services, policy management services, task services and/or other such services may also access the secure execution environment functionality to provide that functionality resources associated with those services. The secure execution environment functionality may also be provided to one or more customers of the computing resource service provider. A user, client, service, module, or other such entity with access to a service and/or access to the resources served by that service may use that secure execution environment functionality to further secure data and/or applications associated with that service. In an illustrative example, a virtual computer system service as described herein above and/or a VM instance associated with that virtual computer system service may use the secure execution environment functionality to create a secure execution environment, populate that secure execution environment with data and/or applications, obtain keys for decrypting results from the secure execution environment, start the applications within the secure execution environment and receive updates. Such secure execution environments may be operating within an environment provided by a computing resource service provider and/or may be operating within an environment provided by a customer of a computing resource service provider.

Secure execution environment functionality may be provided to one or more other services using a variety of techniques. For example, in some embodiments, in response to a request to create a secure execution environment from a customer, a secure execution environment may be created and may be initially populated with executable code which may be configured as a secure execution environment agent to provide access to secure execution environment functionality. The secure execution environment agent may be an application, module, process and/or the like which may be configured to instantiate other applications within the secure execution environment, may be configured to provide security keys from the host computer CPU, may be configured to locate other resources within the computer system or may be configured to perform other such functionality.

Figure 7:
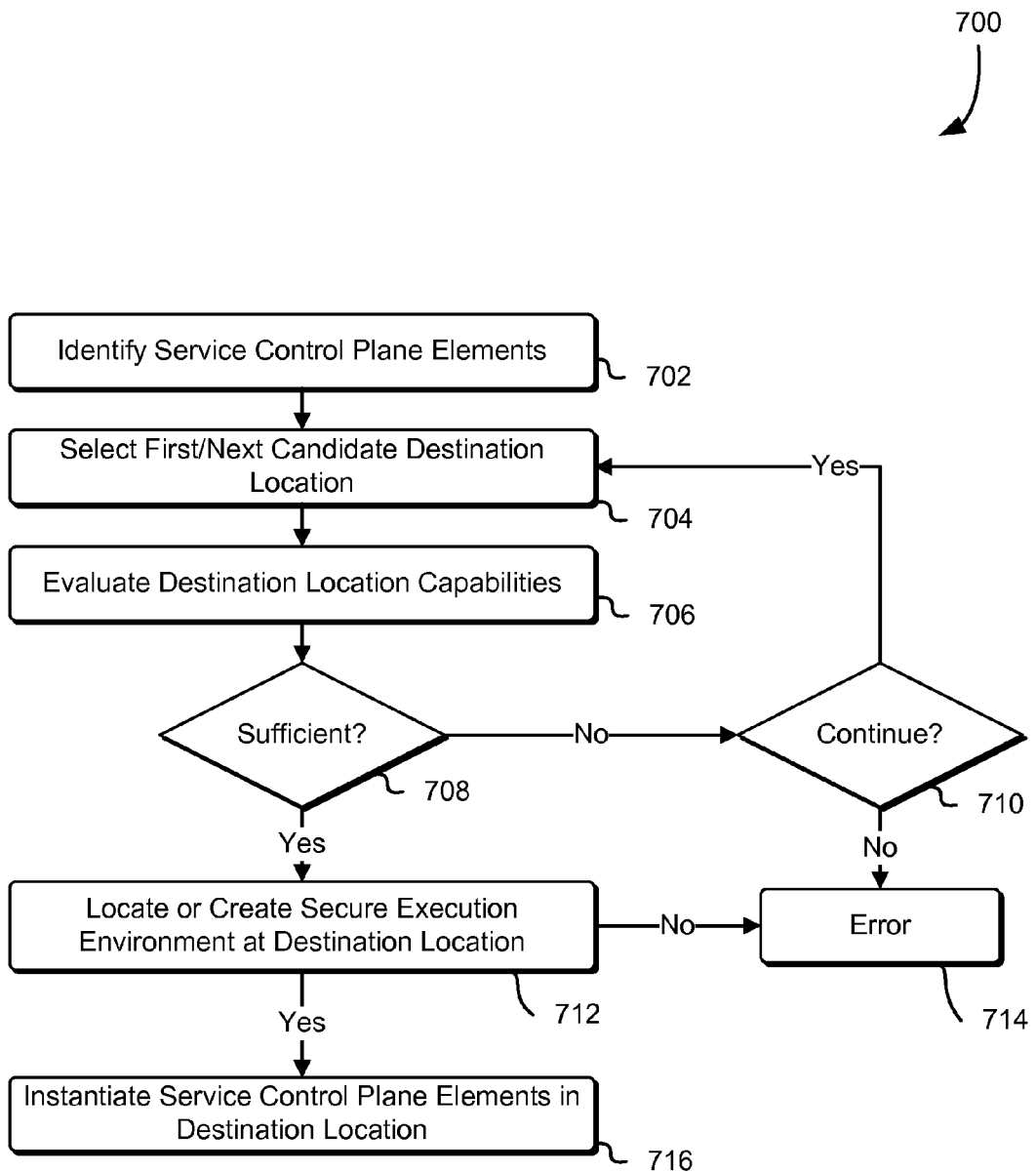
FIG. 7 illustrates an example process for instantiating service control plane elements within a secure execution environment in accordance with an embodiment.

FIG. 7 illustrates an example process 700 for instantiating service control plane elements within a secure execution environment as described in connection with FIG. 1 and in accordance with an embodiment. One or more applications, processes, modules and/or other such entities associated with a secure execution environment such as the secure execution environment 214 described herein at least in connection with FIG. 2 may perform at least a portion of the process illustrated in FIG. 7. A secure execution environment agent such as the secure execution environment agent 408 described herein at least in connection with FIG. 4 may perform at least a portion of the process illustrated in FIG. 7. A bootloader such as the bootloader 412 described herein at least in connection with FIG. 4 may perform at least a portion of the process illustrated in FIG. 7. Other entities operating with a computer system environment may also perform at least a portion of the process illustrated in FIG. 7 including, but not limited to, services, applications, modules, processes, operating system elements, virtual machine elements, network hardware, controlling domain elements (e.g., a hypervisor) or combinations of these and/or other such entities operating within the computer system environment.

One or more service control plane elements may be identified 702 as described in connection with FIG. 6 and in accordance with an embodiment. A first candidate destination location may be selected 704 such that the first candidate destination location may be suitable to securely host the control plane elements. The first candidate destination may be selected 704 based at least in part on a proximity measurement between the candidate destination location and the one or more computer system resources. The first candidate destination location may also be selected 704 based at least in part on a proximity measurement between a client of the service data plane elements and the first candidate location. A proximity measurement may include a measurement of physical proximity (e.g., physical distance between datacenters or physical distance within a datacenter), a measurement of logical proximity (e.g., network latency, network bandwidth, or number of network hops) or a combination of these and/or some other proximity measurements. The candidate destination location may include any device or equipment (e.g., hardware) configured to execute instructions for performing data computation, manipulation or storage tasks, such as a computer system, a server, tablet computers, smart phones, mobile devices, wearable devices and/or other such hardware. The capabilities of the candidate destination location may be evaluated 706 as described in connection with FIG. 6 and in accordance with an embodiment.

If the capabilities of the candidate destination location are sufficient 708, a secure execution environment in the candidate destination location may be located or created 712. The candidate destination may also be added to a set of available candidate destination locations and may, for example, be registered within that set of available candidate destination locations as an acceptable location upon which one or more secure execution environments may be instantiated. If the capabilities of the candidate destination location are not sufficient, the one or more applications, processes, modules, and/or other such entities associated with the secure execution environment may, in some embodiments, continue selecting candidate destination locations 710. If no suitable candidate location is found, the one or more applications, processes, modules and/or other such entities associated with the secure execution environment may, in some embodiments, enter an error state 714 which may be reported to one or more users, services, processes and/or other such computer system entities. After the secure execution environment is located or created 712, the one or more applications, processes, modules, and/or other such entities associated with the secure execution environment may then instantiate at least a subset of the service control plane elements in the secure execution environment 716 as described in connection with FIG. 6 and in accordance with an embodiment.

Figure 8:
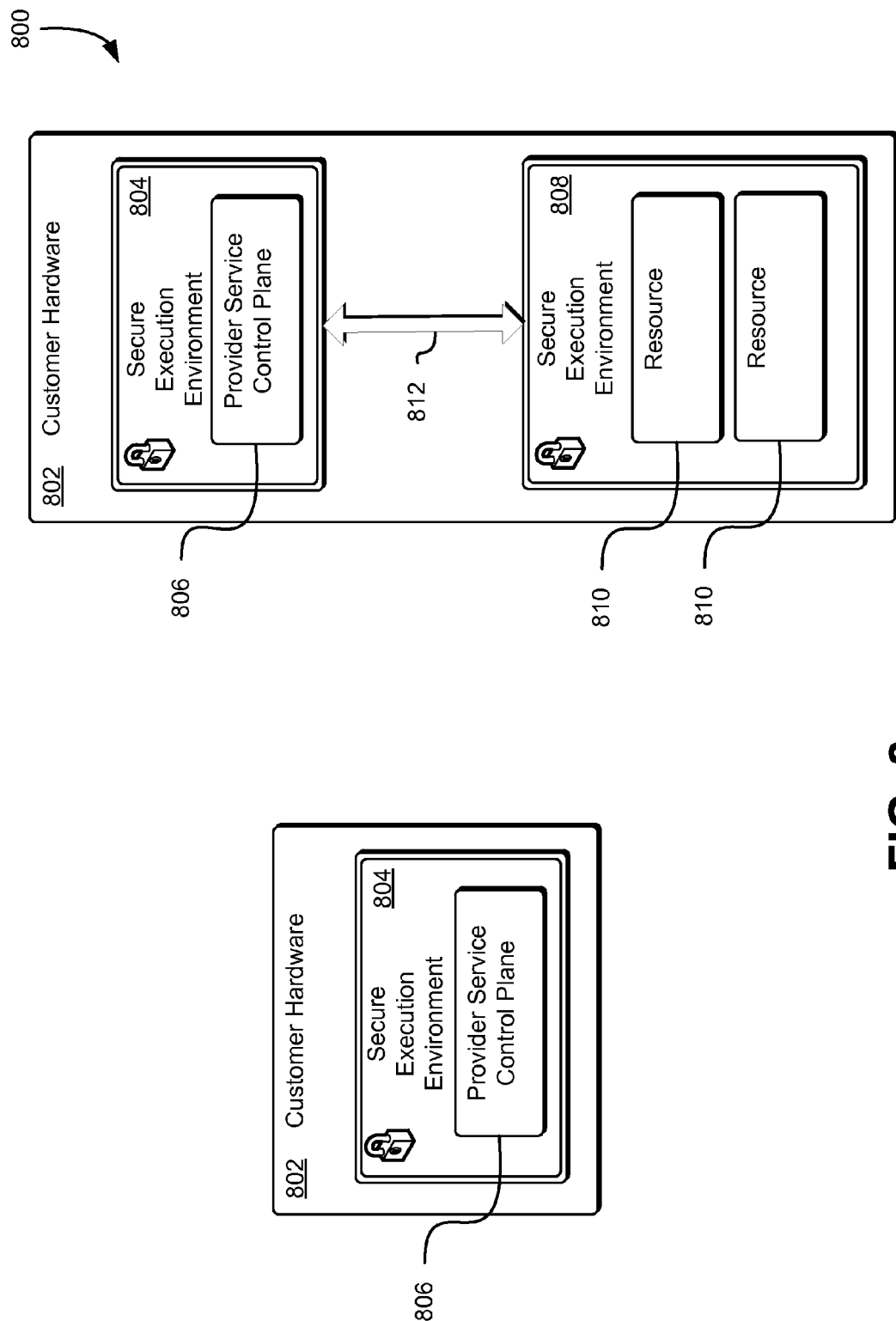
FIG. 8 illustrates an example environment where instances associated with a provider service may be instantiated within a secure execution environment in accordance with an embodiment.

FIG. 8 illustrates an example environment 800 where instances associated with a provider service may be instantiated within a secure execution environment as described in connection with FIG. 1 and in accordance with an embodiment. A provider service control plane 806 running within a first secure execution environment 804 instantiated within customer hardware 802 as described in connection with FIG. 1 and in accordance with an embodiment may receive a request to instantiate one or more additional resources from a service such as a services provided by a computing resource service provider. The resources may be VM instances, or may be data storage resources, or may be virtual devices or may be some other such resources. As a result of receiving the request, the provider service control plane 806 may create and/or locate a second secure execution environment 808 within the customer hardware 802 and may instantiate the one or more additional resources 810 within the second secure execution environment 808. The provider service control plane 806 may be configured to access the additional resources 810 within the second secure execution environment 808 using, for example, a trusted relationship between the first secure execution environment 804 and the second secure execution environment 808.

For example, the provider service control plane 806 may be a provider service control plane for a provider service configured to manage VM instances as described herein above. Such a provider service control plane may be configured with functionality to create VM instances and may also be configured with additional functionality to instantiate secure execution environments. In such an embodiment, the additional resources 810 may be VM instances which may be created by the provider service control plane 806 within a second secure execution environment 808 also instantiated by the provider service control plane 806.

Figure 9:
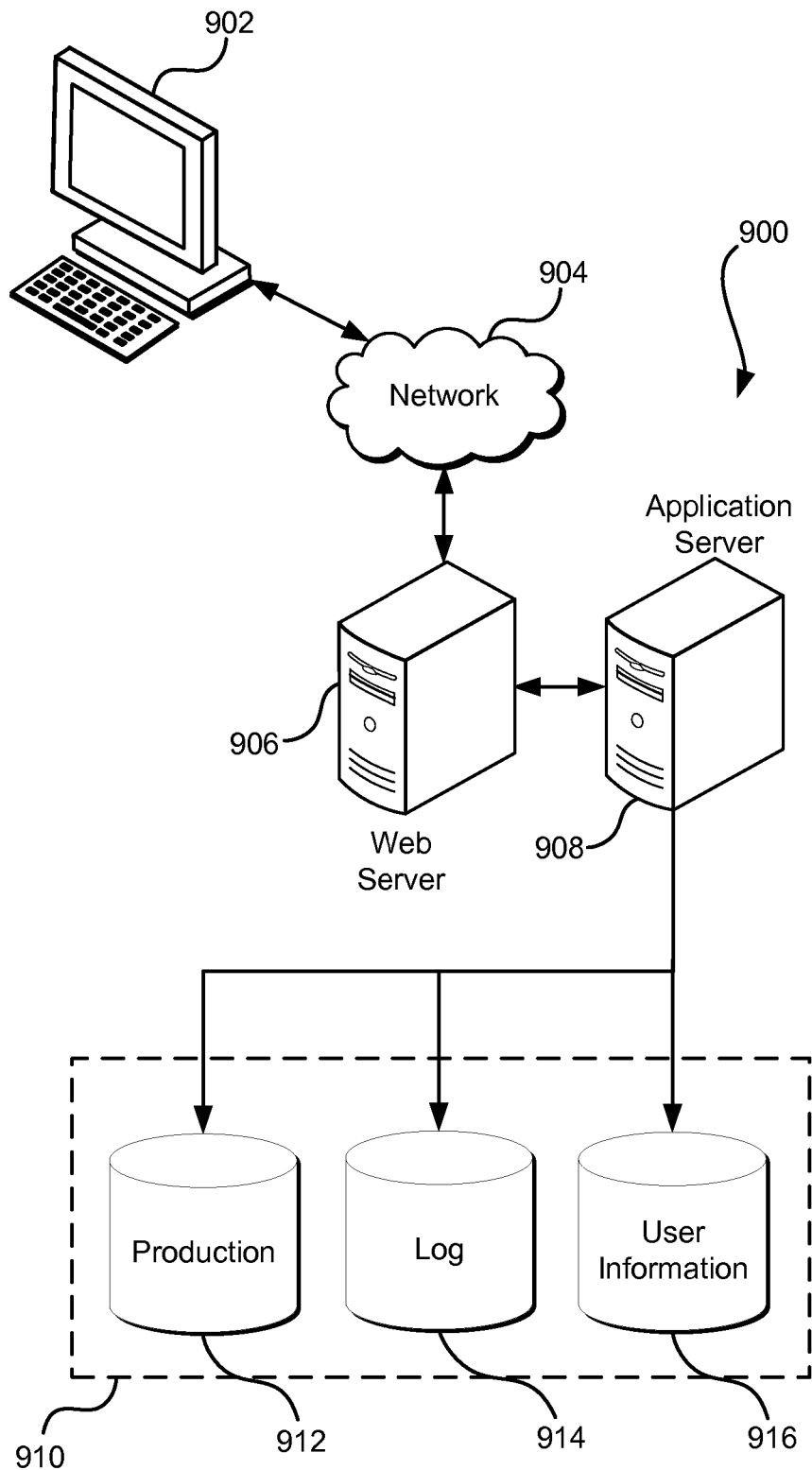
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
   receiving an application programming interface request, the fulfillment of which includes instantiating a control plane of a service provided by a computing resource service provider, the control plane of the service administratively controlling computing resources associated with the service; and
   fulfilling the application programming interface request by at least:
      selecting a target computer system from a set of computer systems, the set of computer systems including a subset of computer systems that are hosted by one or more third parties to the computing resource service provider, the target computer system selected based at least in part on the target computer system being configured to instantiate a secure execution environment;
      sending a provisioning request to the target computer system, the provisioning request configured to cause the target computer system to instantiate the secure execution environment on the target computer system; and
      upon validating the secure execution environment using one or more cryptographic measurements calculated by a processor of the target computer system, instantiating at least a portion of the control plane of the service within the secure execution environment, wherein an agent within the secure execution environment is further configured to fulfill one or more secure execution environment application programming interface requests for managing the secure execution environment, the one or more secure execution environment application programming interface requests including at least one of: measure the secure execution environment or generate a secure execution environment key.

2. The computer-implemented method of claim 1, wherein the target computer system is selected from the subset of computer systems that are hosted by the one or more third parties to the computing resource service provider.

3. The computer-implemented method of claim 1, wherein one or more client applications operate within one or more client secure execution environments, the one or more client secure execution environments hosted on one or more of the subset of the set of computer systems hosted by the party different from the computing resource service provider, the one or more client applications configured to access the control plane of the service.

4. The computer-implemented method of claim 1, wherein the one or more secure execution environment application programming interface requests further include at least one of: create secure execution environment, destroy secure execution environment, populate secure execution environment, resize secure execution environment, start secure execution environment, stop secure execution environment, describe secure execution environment, or update secure execution environment.

5. A system, comprising:
   at least one computing device that implements one or more services, wherein the one or more services:
      receives an application programming interface request, the fulfillment of which includes instantiating a control plane of a service that administratively controls computing resources associated with the service;
      selects a set of target computer systems from one or more computer systems, the set of target computer systems selected based at least in part on each target computer system of the set of target computer systems being configured to instantiate one or more secure execution environments;
      sends a provisioning request to a target computer system of the set of target computer systems, the provisioning request causing the target computer system to instantiate a respective secure execution environment on the target computer system; and
      upon validating at least the respective secure execution environment using one or more cryptographic measurements calculated by a processor of the target computer system, instantiates a control plane of a first service provided by a service provider, the control plane comprising a plurality of control plane components, at least a subset of the plurality of control plane components instantiated within the one or more secure execution environments, the one or more secure execution environments hosted on the one or more target computer systems, the control plane of the first service configured to fulfill one or more web services requests to administratively control resources associated with the first service, wherein an agent within the secure execution environment is further configured to fulfill one or more secure execution environment application programming interface requests for managing the secure execution environment, the one or more secure execution environment application programming interface requests including at least one of: measure the secure execution environment or generate a secure execution environment key.

6. The system of claim 5, wherein a first component of the subset of the plurality of control plane components instantiated within the secure execution environment:
   receives one or more of the one or more web service requests;
   performs one or more operations that at least partially fulfill the one or more of the one or more web service requests; and
   sends a request for fulfillment to a second component of the subset of the plurality of control plane components, the request for fulfillment based at least in part on the one or more operations, the request for fulfillment at least including an attestation of a state of the first component.

7. The system of claim 5, wherein the provisioning request specifies one or more control plane components to instantiate on the respective target computer system.

8. The system of claim 5, wherein the set of target computer systems are further selected based at least in part on one or more security requirements of the one or more secure execution environments.

9. The system of claim 5, wherein at least a subset of the set of target computer systems are hosted by a party other than the service provider.

10. The system of claim 9, wherein one or more applications operate on the subset of the set of target computer that are hosted by the party other than the service provider, the one or more applications provided by the party other than the service provider.

11. The system of claim 5, wherein the subset of the plurality of control plane components instantiated within one or more secure execution environments includes a control plane component that authenticates one or more of the one or more web services requests.

12. The system of claim 5, wherein the subset of the plurality of control plane components instantiated within one or more secure execution environments includes a control plane component that instantiates one or more virtual machine instances.

13. One or more non-transitory computer-readable storage media having stored thereon instructions that, as a result of execution by one or more processors, cause a system to:
   receive an application programming interface request, the fulfillment of which includes instantiating a control plane of a service that administratively controls computing resources associated with the service;
   select a set of target computer systems from one or more computer systems, the set of target computer systems selected based at least in part on each target computer system of the set of target computer systems having a capability of instantiating one or more secure execution environments;
   instantiate a control plane of a first service provided by a service provider, the control plane comprising a plurality of control plane components, at least a subset of the plurality of control plane components instantiated within the one or more secure execution environments, the one or more secure execution environments hosted on the one or more target computer systems, the control plane of the first service configured to fulfill one or more web services requests to administratively control resources associated with the first service, wherein an agent within the secure execution environment is further configured to fulfill one or more secure execution environment application programming interface requests for managing the secure execution environment, the one or more secure execution environment application programming interface requests including at least one of: measure the secure execution environment or generate a secure execution environment key.

14. The one or more non-transitory storage media of claim 13, wherein the target computer system is selected from a subset of the set of computer systems that is hosted by a third party to the service provider.

15. The one or more non-transitory storage media of claim 13, wherein one or more client applications operate within one or more client secure execution environments, the one or more client secure execution environments hosted on one or more of the subset of the set of computer systems hosted by the party different from the service provider, the one or more client applications configured to access the control plane of the service.

16. The one or more non-transitory storage media of claim 13, wherein an agent within the secure execution environment is further configured to fulfill one or more secure execution environment application programming interface requests for managing the secure execution environment, the one or more secure execution environment application programming interface requests including at least one of: destroy secure execution environment, populate secure execution environment, resize secure execution environment, stop secure execution environment, describe secure execution environment, or update secure execution environment.

17. The one or more non-transitory storage media of claim 13, wherein a first component of the subset of the plurality of control plane components instantiated within the secure execution environment is configured to:
   receive one or more of the one or more web service requests;
   perform one or more operations configured to at least partially fulfill the one or more of the one or more web service requests; and
   send a request for fulfillment to a second component of the subset of the plurality of control plane components, the request for fulfillment based at least in part on the one or more operations, the request for fulfillment at least including an attestation of a state of the first component.

18. The one or more non-transitory storage media of claim 13, wherein a third-party target computer systems is hosted by a party other than the service provider.

19. The one or more non-transitory storage media of claim 13, wherein the subset of the plurality of control plane components instantiated within one or more secure execution environments includes a control plane component configured to instantiate one or more virtual machine instances.

20. The one or more non-transitory storage media of claim 13, wherein the subset of the plurality of control plane components instantiated within one or more secure execution environments includes a control plane component configured to authenticate one or more of the one or more web services requests.

* * * * *